(12) United States Patent
Hasebe et al.

(10) Patent No.: US 7,974,166 B2
(45) Date of Patent: Jul. 5, 2011

(54) INFORMATION RECORDING DEVICE AND INFORMATION RECORDING METHOD GENERATING A COPY PREVENTING STRUCTURE

(75) Inventors: Tsuyoshi Hasebe, Saitama (JP); Kazuo Kuroda, Saitama (JP)

(73) Assignee: Pioneer Corporation, Tokyo (JP)

( * ) Notice: Subject to any disclaimer, the term of this patent is extended or adjusted under 35 U.S.C. 154(b) by 430 days.

(21) Appl. No.: 12/160,712

(22) PCT Filed: Jan. 17, 2007

(86) PCT No.: PCT/JP2007/050585
§ 371 (c)(1),
(2), (4) Date: Jul. 11, 2008

(87) PCT Pub. No.: WO2007/083658
PCT Pub. Date: Jul. 26, 2007

(65) Prior Publication Data
US 2010/0220565 A1    Sep. 2, 2010

(30) Foreign Application Priority Data
Jan. 17, 2006  (JP) .................................. 2006-008747

(51) Int. Cl.
*G11B 11/00*    (2006.01)

(52) U.S. Cl. ................. 369/53.21; 369/47.13; 369/47.16
(58) Field of Classification Search ............... 369/53.16, 369/47.18, 47.13
See application file for complete search history.

(56) References Cited

U.S. PATENT DOCUMENTS

| | | | | |
|---|---|---|---|---|
| 2001/0007544 A1* | 7/2001 | Fujisawa et al. | ........... | 369/47.12 |
| 2002/0067679 A1* | 6/2002 | Eom et al. | ................ | 369/59.25 |
| 2003/0133380 A1* | 7/2003 | Safrin | .................. | 369/53.21 |
| 2005/0030869 A1* | 2/2005 | Lee | ..................... | 369/53.31 |
| 2005/0185545 A1* | 8/2005 | Hwang et al. | ........... | 369/47.27 |
| 2005/0185926 A1* | 8/2005 | Basile et al. | ............ | 386/94 |

FOREIGN PATENT DOCUMENTS

| | | |
|---|---|---|
| JP | 2001-357536 | 12/2001 |
| JP | 2004-192678 | 7/2004 |
| JP | 2005-32374 | 2/2005 |

* cited by examiner

*Primary Examiner* — Lixi C Simpson
(74) *Attorney, Agent, or Firm* — Young & Thompson

(57) ABSTRACT

User data is recorded onto a DVD by the incremental recording method and by using padding when closing a recording zone, read error data is recorded onto the DVD. The read error data is generated by making a sector error detection code or a PI/PO error correction code in the ECC block different from a correct value.

7 Claims, 20 Drawing Sheets

[FIG. 1]
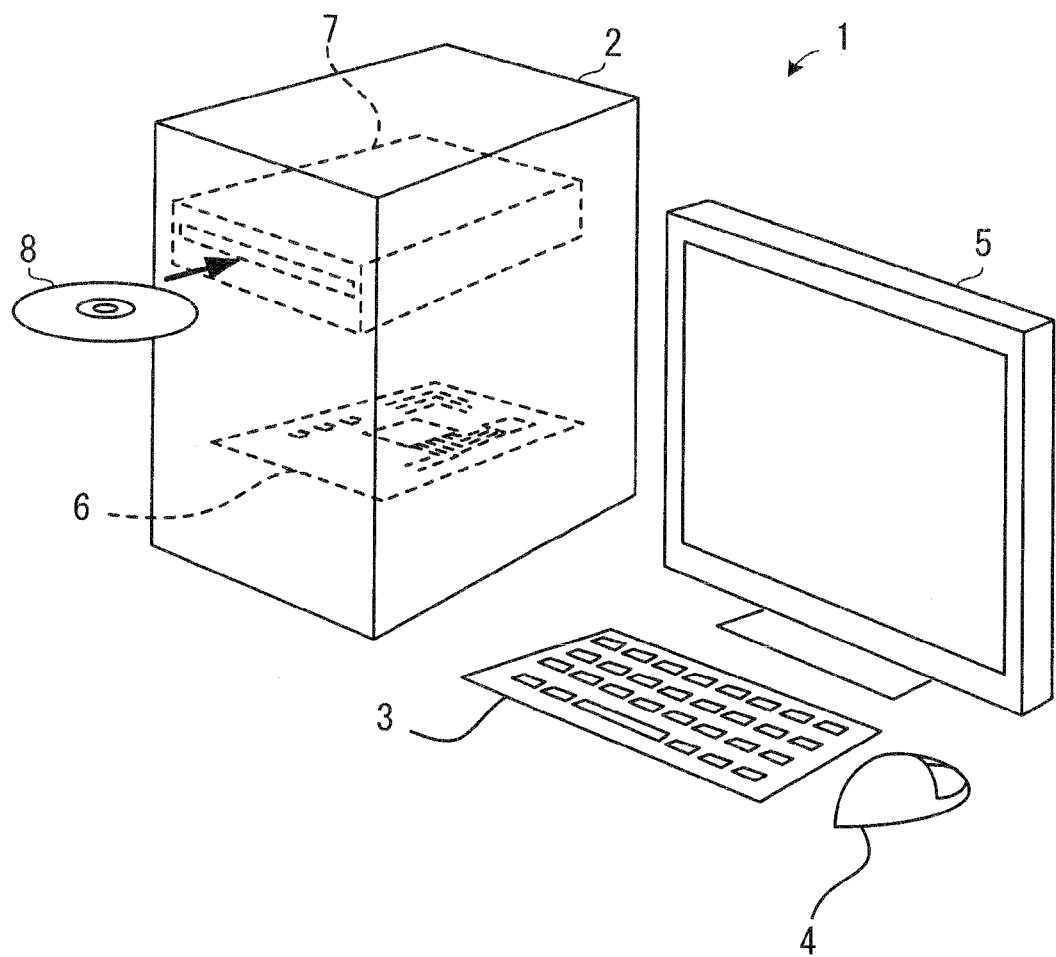

[FIG. 2]
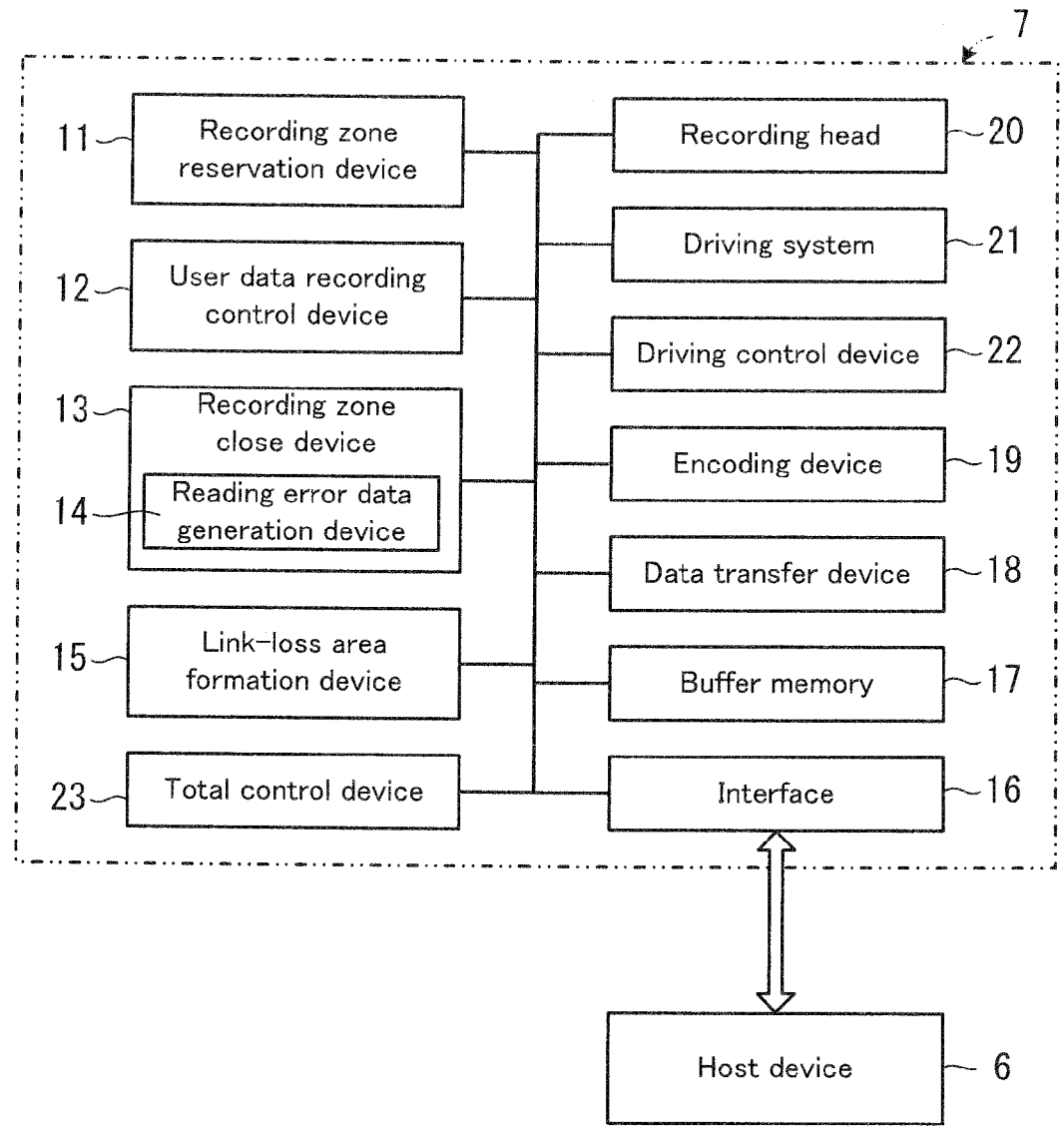

[FIG. 3]
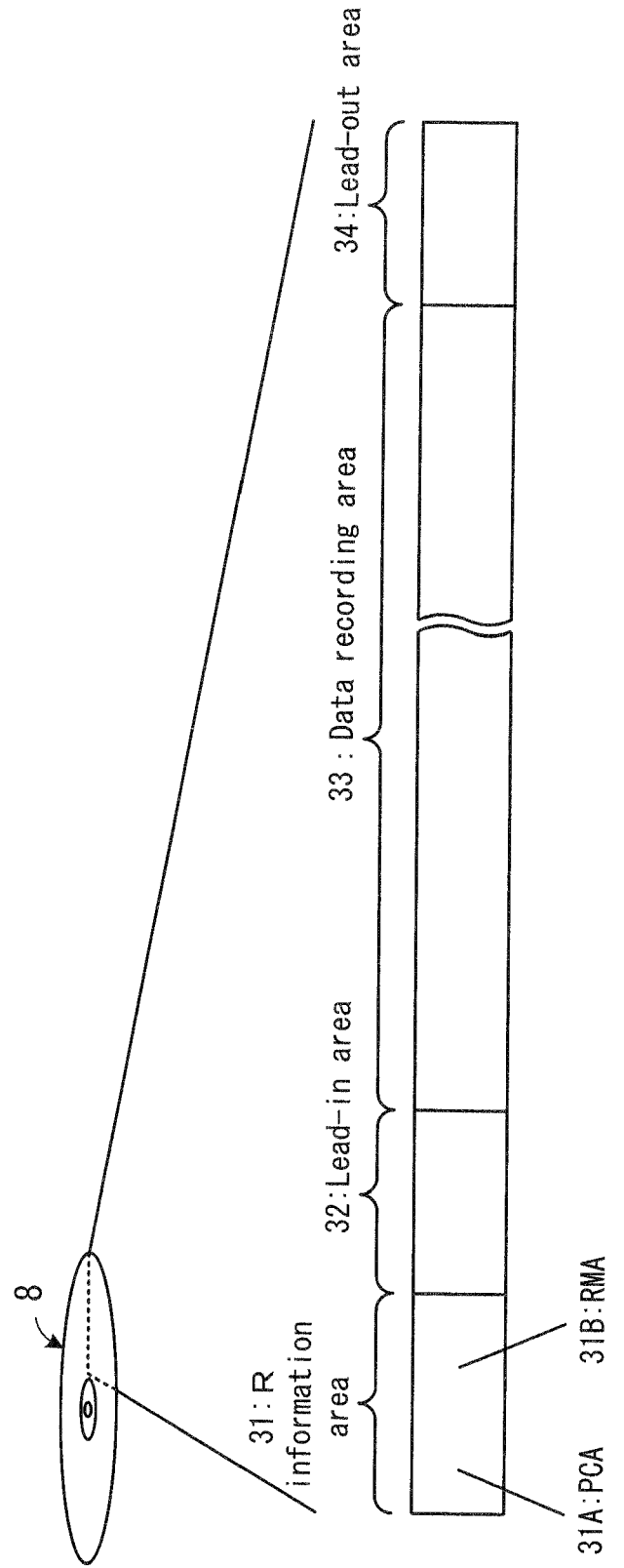

[FIG. 4]
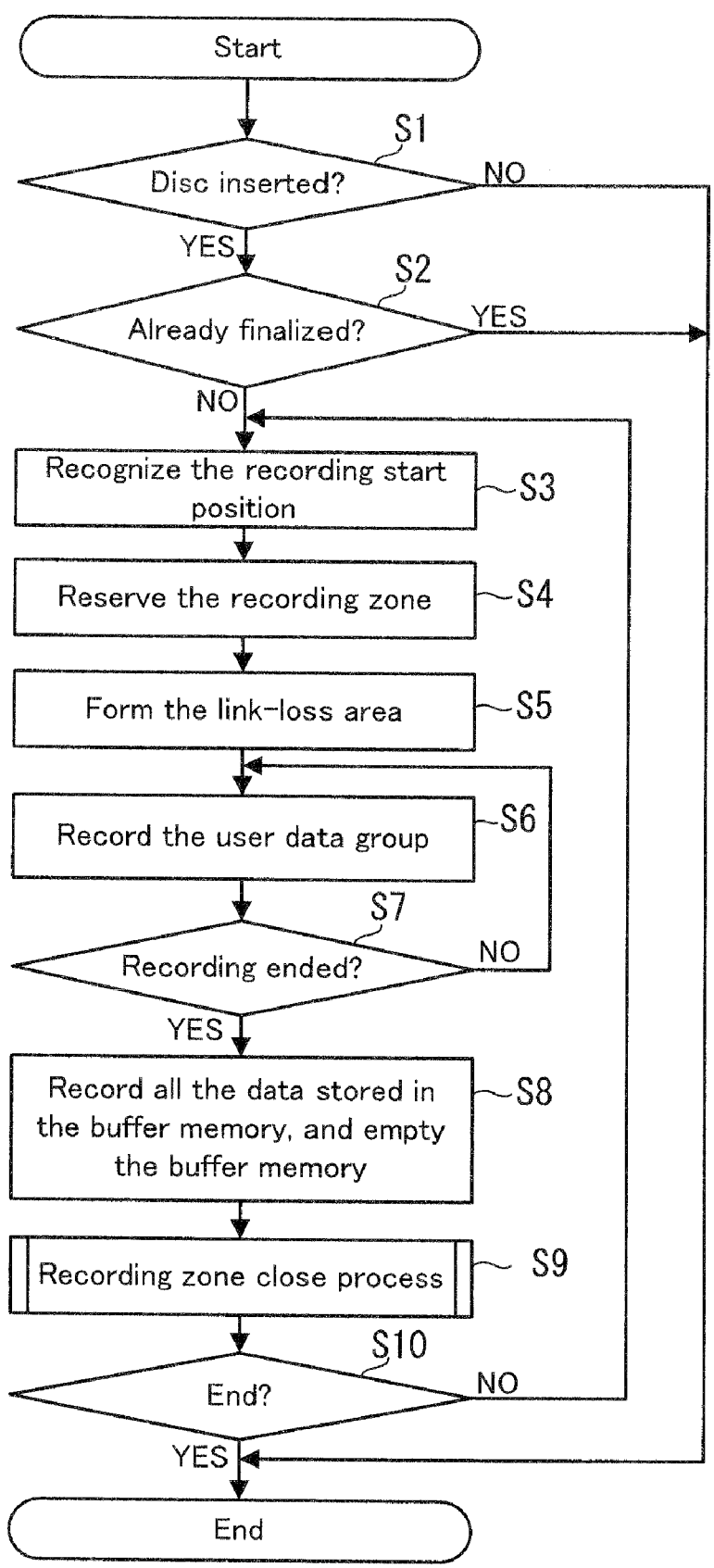

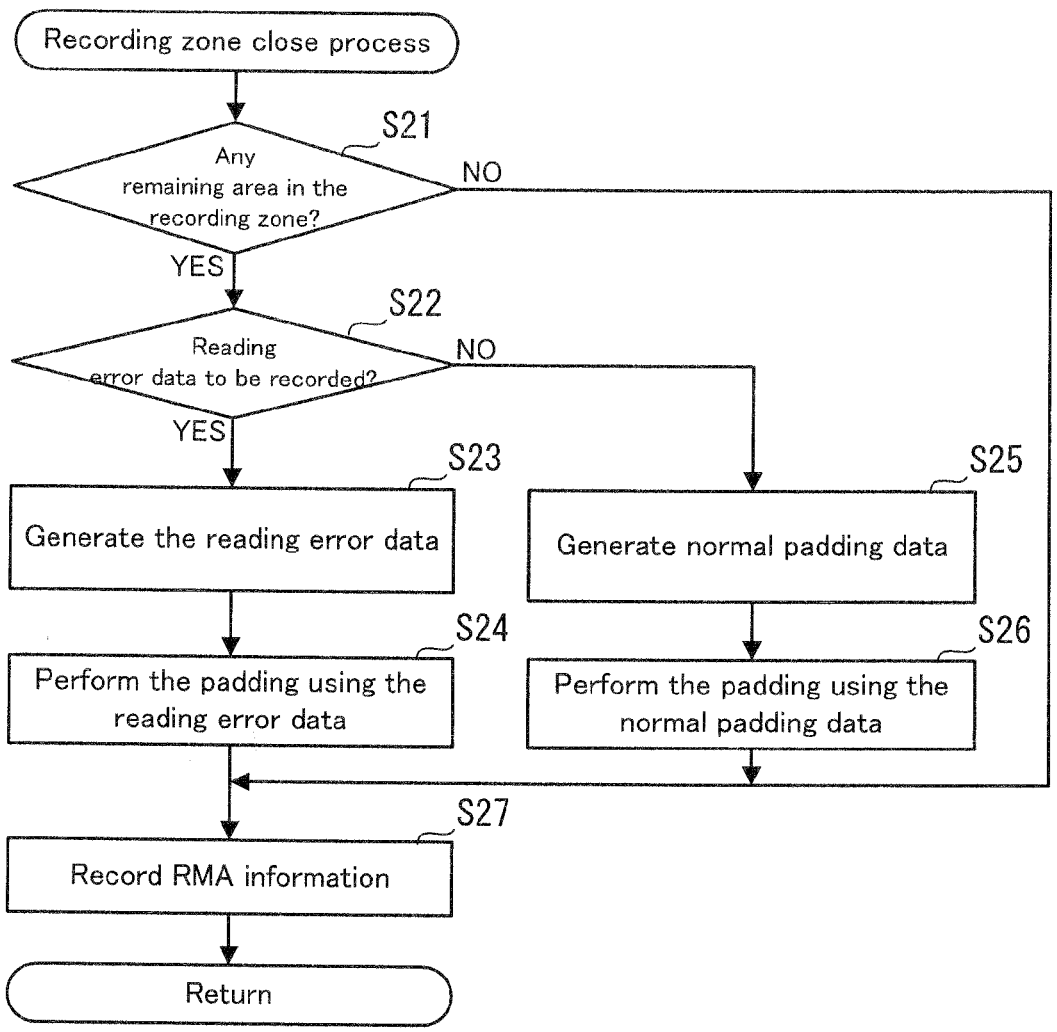
[FIG. 5]

[FIG. 6]
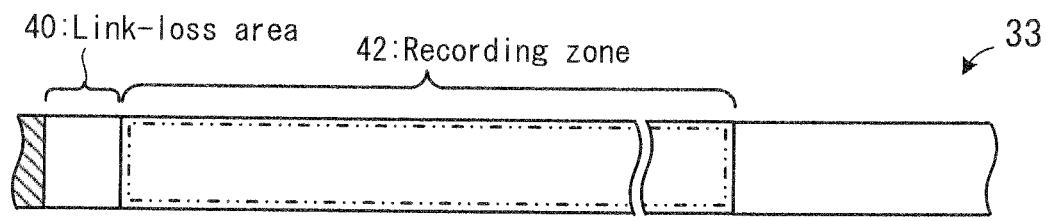
[FIG. 7]
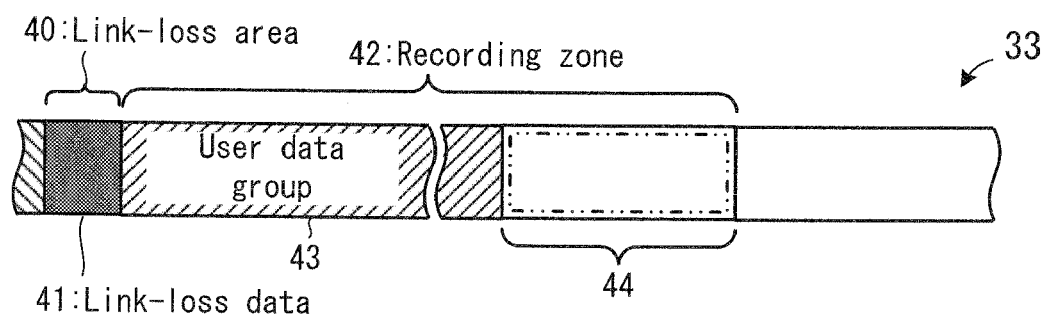
[FIG. 8]
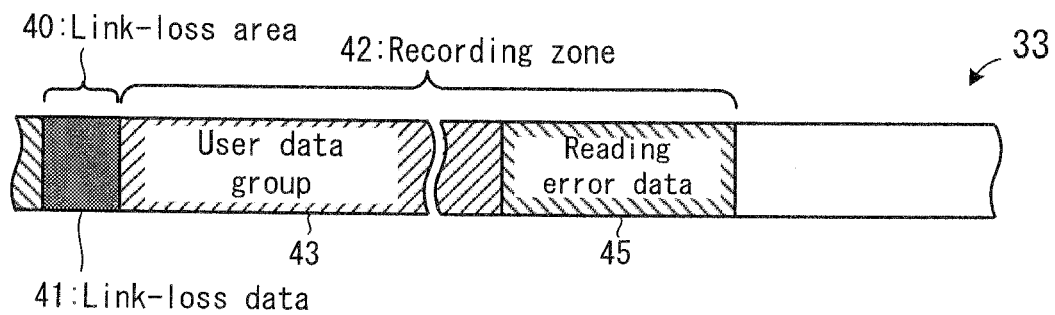

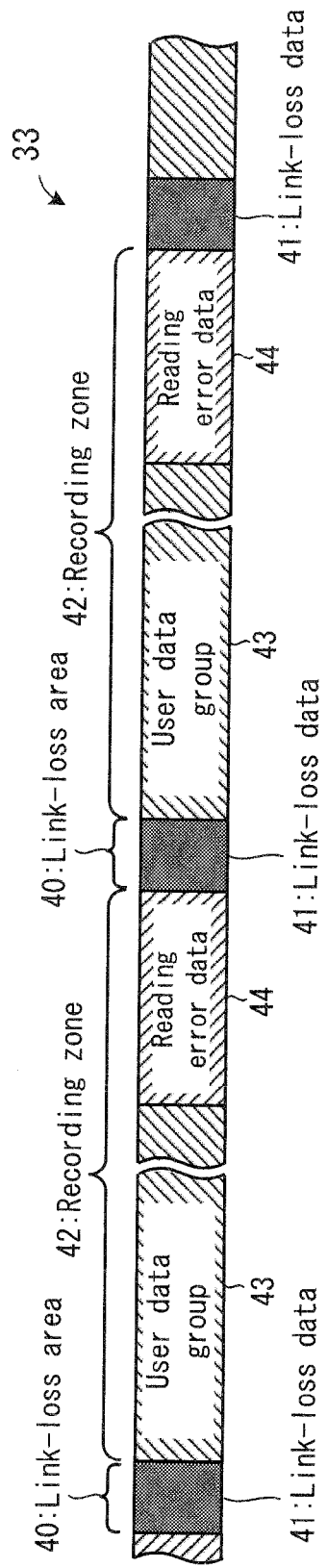
[FIG. 9]

[FIG. 10]
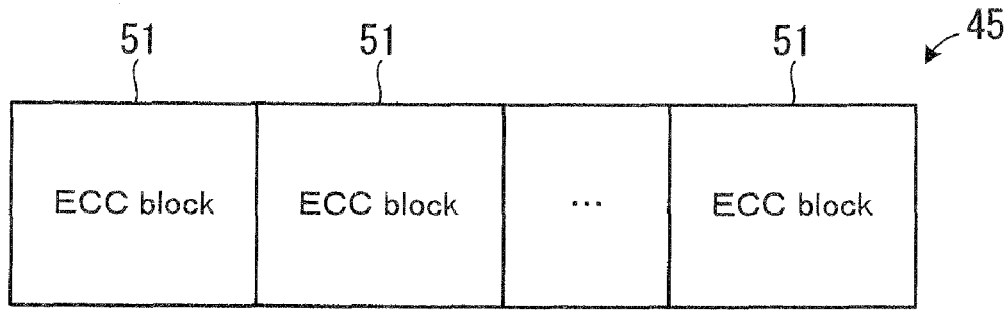

[FIG. 11]

| | | | | | | | | | |
|---|---|---|---|---|---|---|---|---|---|
| $B_{0,181}$ | $B_{1,181}$ | $B_{2,181}$ | .... | $B_{189,181}$ | $B_{190,181}$ | $B_{191,181}$ | $B_{192,181}$ | .... | $B_{207,181}$ |
| ⋮ | ⋮ | ⋮ | .... | ⋮ | ⋮ | ⋮ | ⋮ | .... | ⋮ |
| $B_{0,172}$ | $B_{1,172}$ | $B_{2,172}$ | .... | $B_{189,172}$ | $B_{190,172}$ | $B_{191,172}$ | $B_{192,172}$ | .... | $B_{207,172}$ |
| $B_{0,171}$ | $B_{1,171}$ | $B_{2,171}$ | .... | $B_{189,171}$ | $B_{190,171}$ | $B_{191,171}$ | $B_{192,171}$ | .... | $B_{207,171}$ |
| $B_{0,170}$ | $B_{1,170}$ | $B_{2,170}$ | .... | $B_{189,170}$ | $B_{190,170}$ | $B_{191,170}$ | $B_{192,170}$ | .... | $B_{207,170}$ |
| ⋮ | ⋮ | ⋮ | .... | ⋮ | ⋮ | ⋮ | ⋮ | .... | ⋮ |
| $B_{0,1}$ | $B_{1,1}$ | $B_{2,1}$ | .... | $B_{189,1}$ | $B_{190,1}$ | $B_{191,1}$ | $B_{192,1}$ | .... | $B_{207,1}$ |
| $B_{0,0}$ | $B_{1,0}$ | $B_{2,0}$ | .... | $B_{189,0}$ | $B_{190,0}$ | $B_{191,0}$ | $B_{192,0}$ | .... | $B_{207,0}$ |

[FIG. 12]
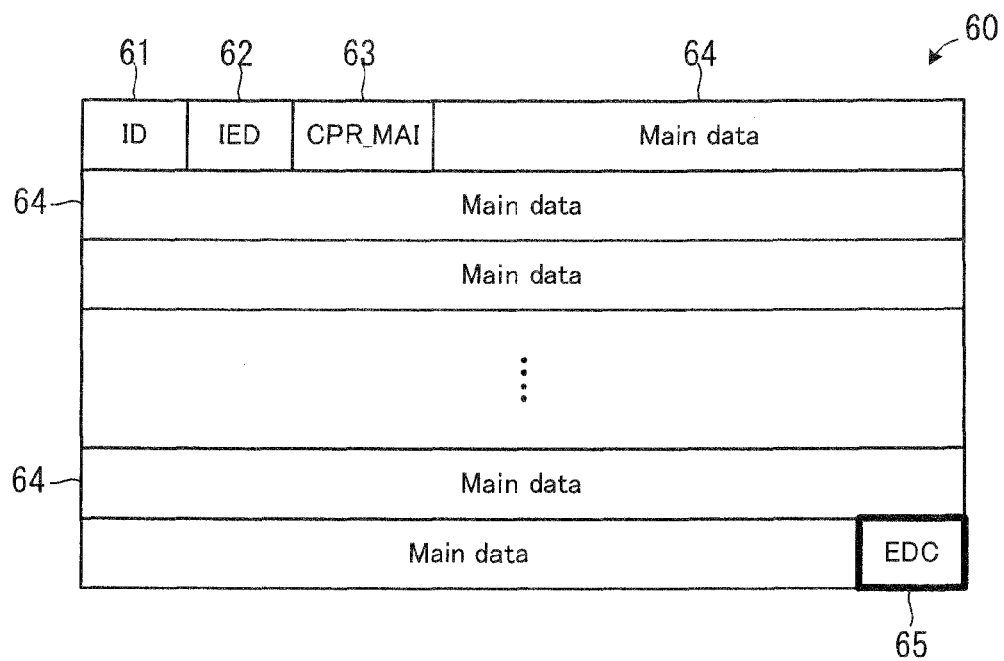

[FIG. 13]
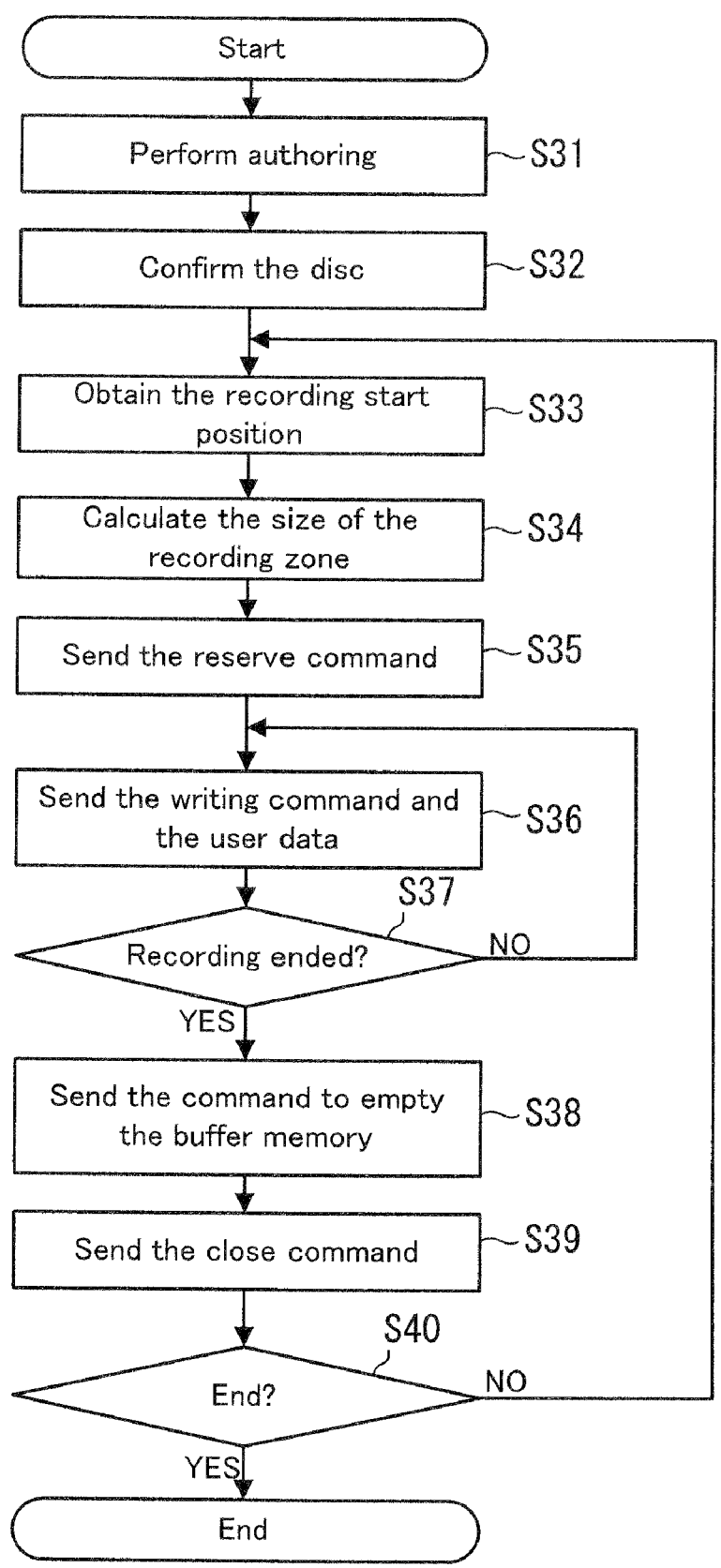

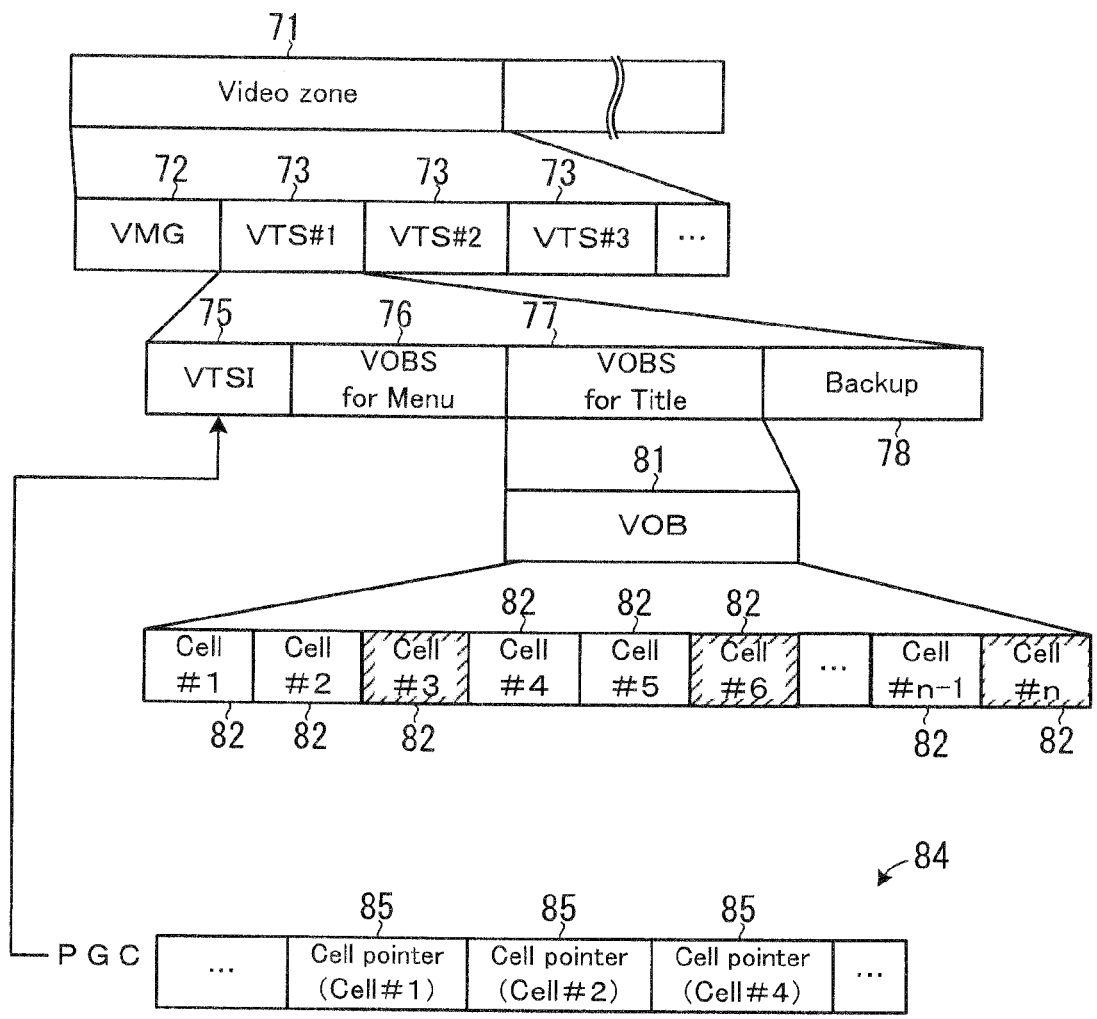
[FIG. 14]

[FIG. 15]
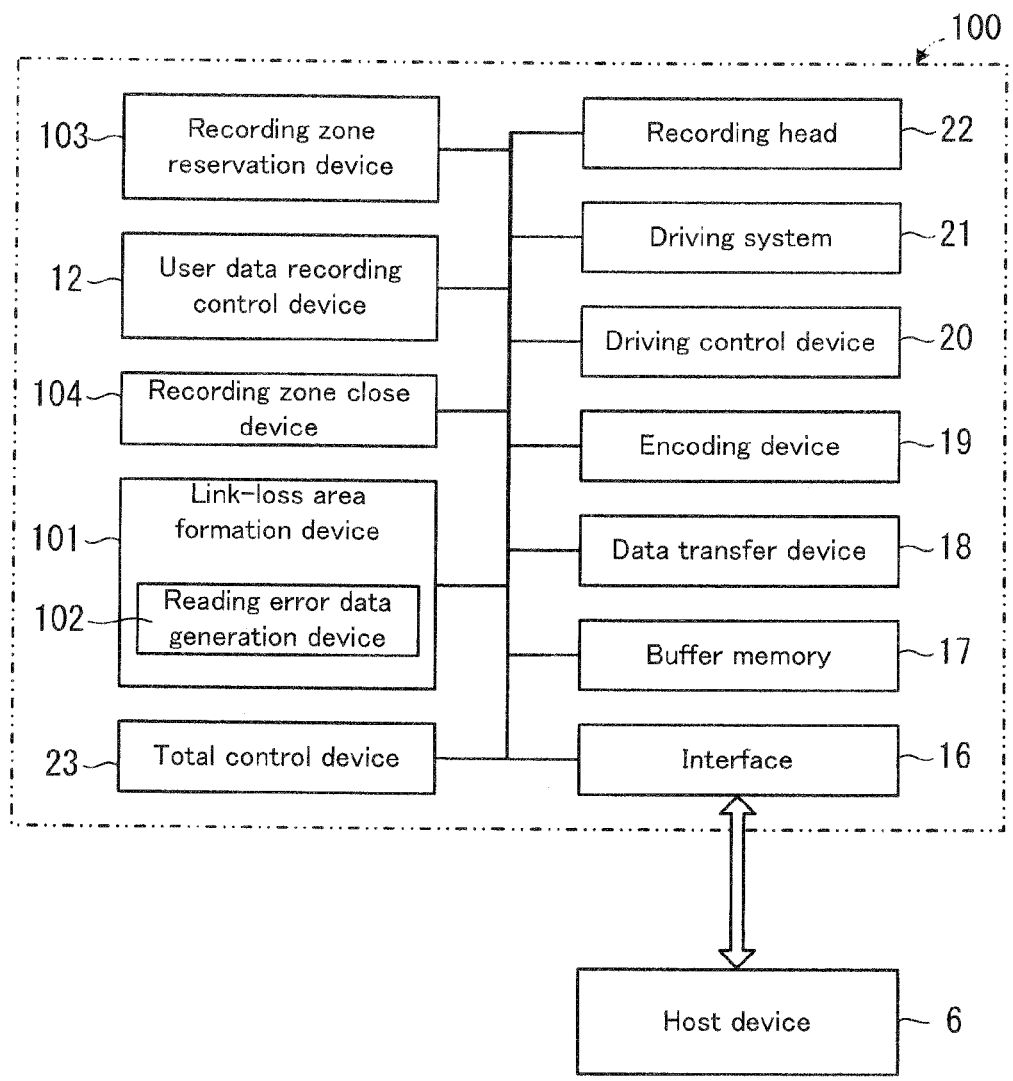

[FIG. 16]
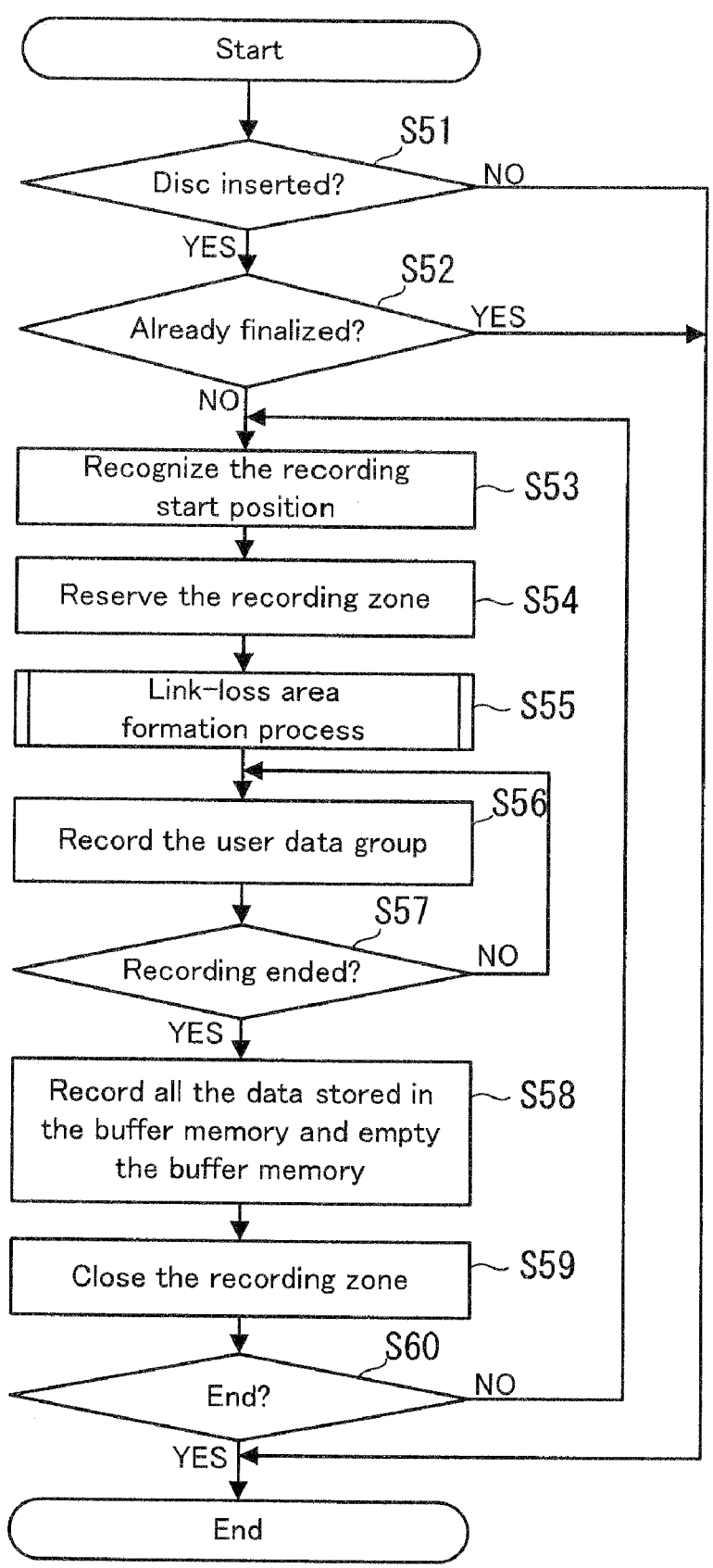

[FIG. 17]
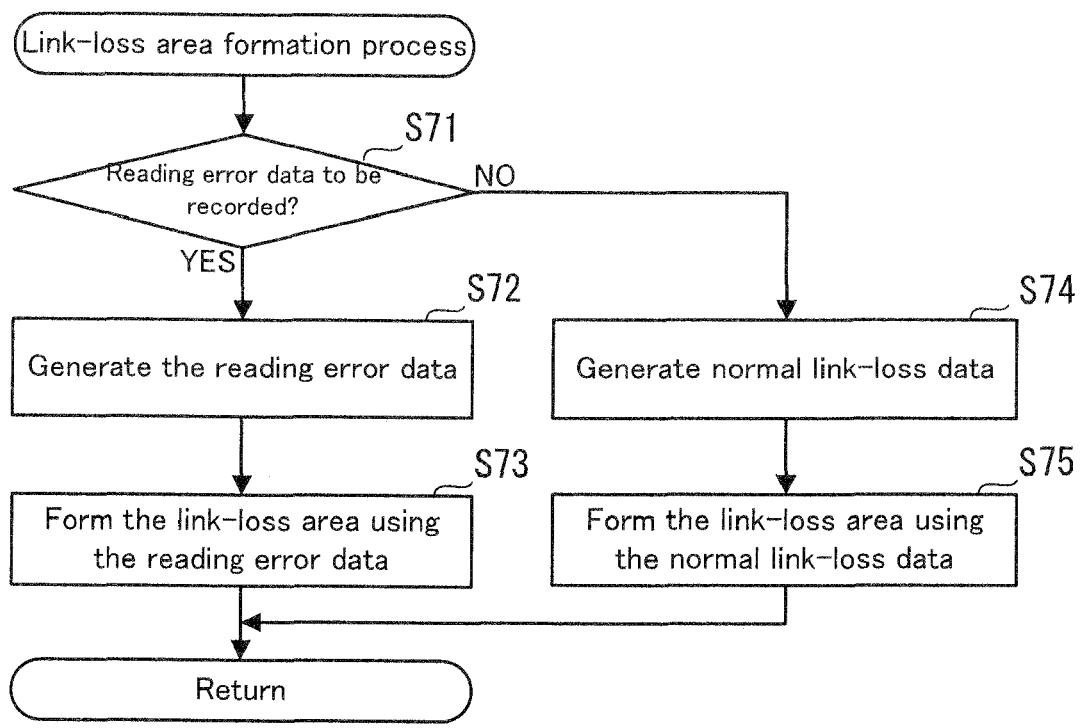

[FIG. 18]
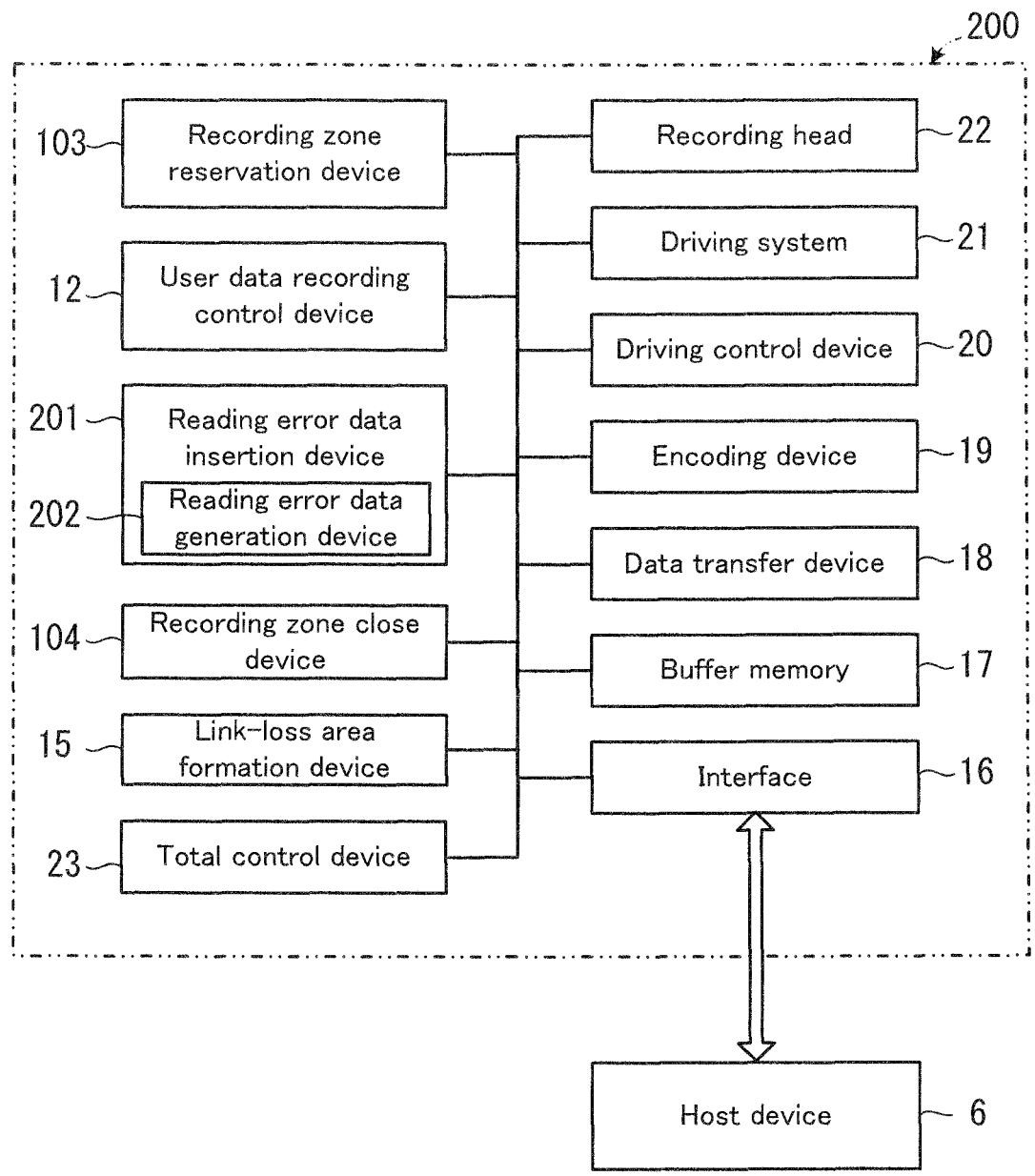

[FIG. 19]
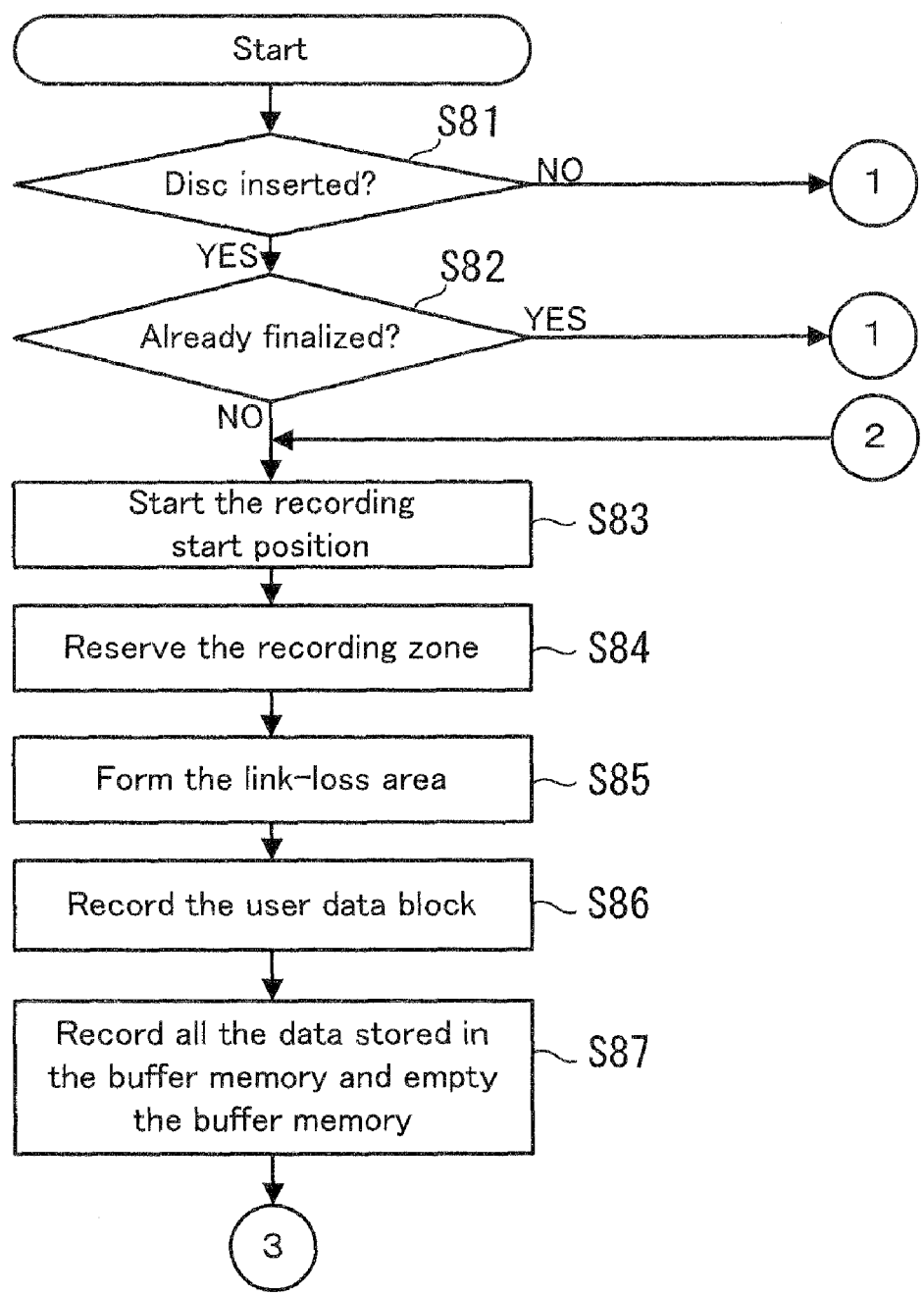

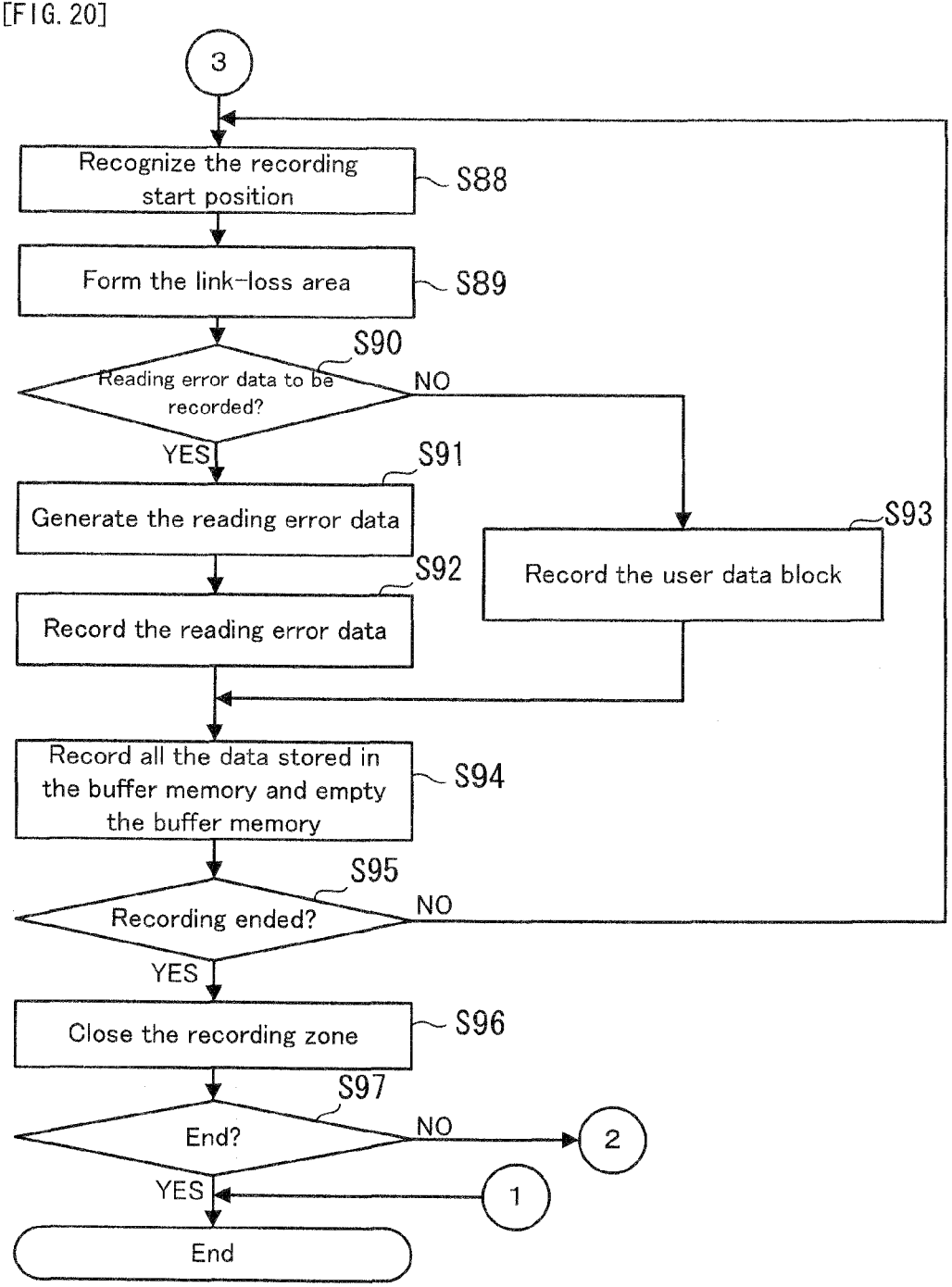

[FIG. 21]
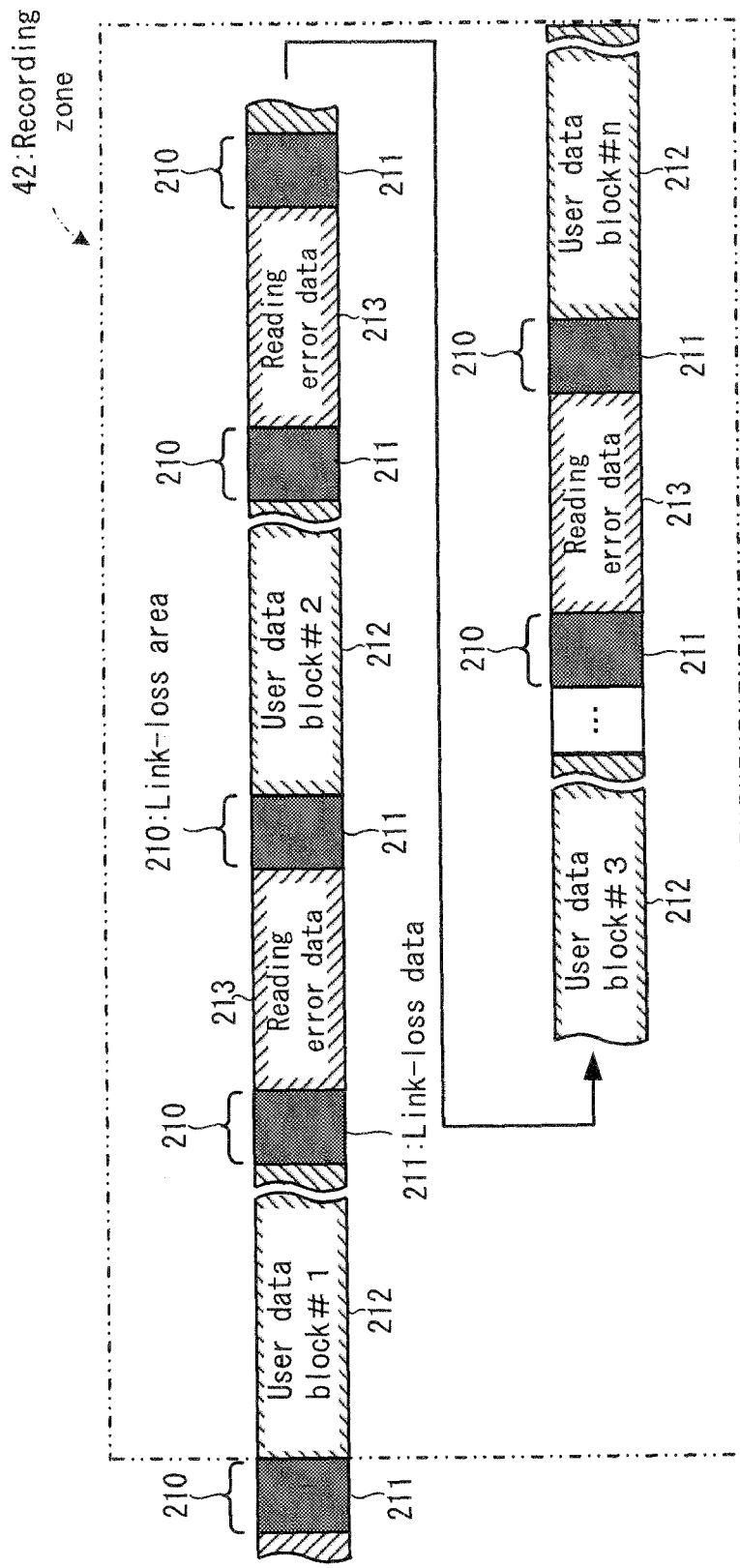

[FIG. 22]
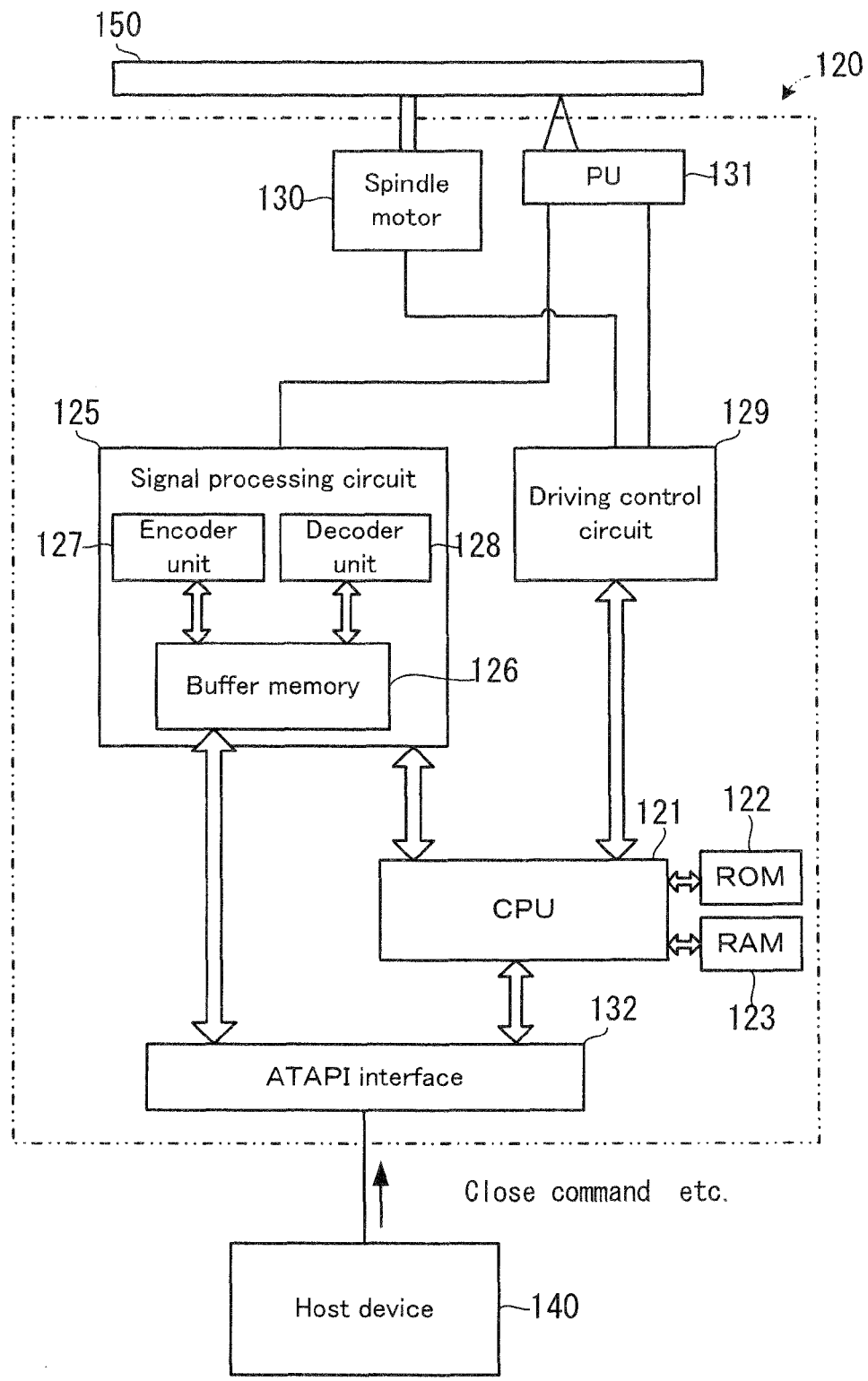

INFORMATION RECORDING DEVICE AND INFORMATION RECORDING METHOD GENERATING A COPY PREVENTING STRUCTURE

TECHNICAL FIELD

The present invention relates to an information recording apparatus for and an information recording method of recording information onto an information recording medium, such as a DVD, and specifically relates to an information recording apparatus for and an information recording method of generating a copy prevention structure on the information recording medium, to thereby prevent the copying of the information recorded on the information recording medium.

BACKGROUND ART

For example, content data such as a movie and music is recorded onto a DVD. Such content data is digital data. Thus, even if the content data is copied, the data itself does not deteriorate. As a result, if one content data to be a source is obtained, it is possible to make many copies of the content data with the same content, and furthermore, using the copied content data as a source, it is possible to make more copies of the content data with the same content.

Thus, with respect to the information recording medium, such as a DVD, on which the digital data is recorded, measures for restricting the copying are taken for copyright protection. The most general measure of them is to encrypt the content data.

DISCLOSURE OF INVENTION

Subject to be Solved by the Invention

There are some suggestions as to the method of encrypting the content data. In the encryption methods, some ingenuity is exercised so as not to easily decrypt the encryption of the content data, such as setting a double or triple encryption key.

However, the encryption of the content data is possibly decrypted by a relentless analysis aimed at the decryption and by the leak of the encryption key and other encryption information, because the encrypted content data can be decrypted by a legal reproducing apparatus.

Thus, only the encryption of the content data can hardly prevent the illegal copy for copyright protection or the like.

In view of the aforementioned problems, it is therefore a first object of the present invention to provide an information recording apparatus, an information recording method, and a computer program, which can enhance the copy prevention of information recorded on the information recording medium.

It is a second object of the present invention to provide an information recording apparatus, an information recording method, and a computer program, which can generate a copy prevention structure on the information recording medium, with hardly blocking a process of recording the information onto the information recording medium.

It is a third object of the present invention to provide an information recording apparatus, an information recording method, and a computer program, which can realize both the high-speed information recording and the generation of the copy prevention structure on the information recording medium.

It is a fourth object of the present invention to provide an information recording apparatus, an information recording method, and a computer program, which can easily generate the copy prevention structure on the information recording medium.

Means for Solving the Subject

The above object of the present invention can be achieved by an information recording apparatus for recording user data onto an information recording medium, in accordance with a recording method in which the user data can be further written once after the user data is once recorded, the information recording apparatus provided with: a recording zone reserving device for reserving a recording zone on the information recording medium, the recording zone being a continuous area for writing once a user data group, which is a group of the user data; a user data recording device for recording the user data included in the user data group, into the recording zone reserved by the recording zone reserving device; and a read error data recording device for recording read error data onto the information recording medium, the read error data causing a read error when information is read from the information recording medium by another apparatus.

The above object of the present invention can be also achieved by an information recording method of recording user data onto an information recording medium, in accordance with a recording method in which the user data can be further written once after the user data is once recorded, the information recording method provided with: a recording zone reserving process of reserving a recording zone on the information recording medium, the recording zone being a continuous area for writing once a user data group, which is a group of the user data; a user data recording process of recording the user data included in the user data group, into the recording zone reserved by the recording zone reserving device; and a read error data recording process of recording read error data onto the information recording medium, the read error data causing a read error when information is read from the information recording medium by another apparatus.

The above object of the present invention can be also achieved by a computer program making a computer perform the aforementioned information recording method of the present invention.

The above object of the present invention can be also achieved by a computer program product in a computer-readable medium for tangibly embodying a program of instructions executable by a computer, the computer program product making the computer perform the aforementioned information recording method of the present invention.

According to the computer program product of the present invention, the aforementioned information recording method of the present invention can be embodied relatively readily, by loading the computer program product from a recording medium for storing the computer program product, such as a ROM (Read Only Memory), a CD-ROM (Compact Disc-Read Only Memory), a DVD-ROM (DVD Read Only Memory), a hard disk or the like, into the computer, or by downloading the computer program product, which may be a carrier wave, into the computer via a communication device. More specifically, the computer program product may include computer readable codes to cause the computer (or may comprise computer readable instructions for causing the computer) to perform the aforementioned information recording method of the present invention.

These effects and other advantages of the present invention will become more apparent from the embodiments explained below.

BRIEF DESCRIPTION OF DRAWINGS

FIG. 1 is an explanatory diagram showing an information recording apparatus in a first embodiment of the present invention.

FIG. 2 is a block diagram showing an inner structure of a DVD drive apparatus in FIG. 1.

FIG. 3 is an explanatory diagram showing the structure of a recording area of a DVD-RW.

FIG. 4 is a flowchart showing a write-once process of the DVD drive apparatus in FIG. 1.

FIG. 5 is a flowchart showing a recording zone close process in FIG. 4.

FIG. 6 is an explanatory diagram showing that a link-loss area and a recording zone are reserved in a data recording area of a DVD.

FIG. 7 is an explanatory diagram showing that link-loss data and a user data group are recorded in the data recording area of the DVD.

FIG. 8 is an explanatory diagram showing that the link-loss data, the user data group, read error data are recorded in the data recording area of the DVD.

FIG. 9 is an explanatory diagram showing that a plurality of recording zones are formed in the data recording area of the DVD.

FIG. 10 is an explanatory diagram showing the structure of the read error data.

FIG. 11 is an explanatory diagram showing the structure of an ECC block.

FIG. 12 is an explanatory diagram showing the structure of a sector.

FIG. 13 is a flowchart showing the process of a host device for making the DVD drive apparatus perform the write-once process.

FIG. 14 is an explanatory diagram showing the data format of a DVD video.

FIG. 15 is an explanatory diagram showing an information recording apparatus in a second embodiment of the present invention.

FIG. 16 is a flowchart showing a write-once process of the DVD drive apparatus in FIG. 15.

FIG. 17 is a flowchart showing a link-loss area formation process in FIG. 16.

FIG. 18 is an explanatory diagram showing an information recording apparatus in a third embodiment of the present invention.

FIG. 19 is a flowchart showing a write-once process of the DVD drive apparatus in FIG. 18.

FIG. 20 is a flowchart following FIG. 19.

FIG. 21 is an explanatory diagram showing user data and the like recorded in the recording zone by the write-once process in FIG. 19 and FIG. 20.

FIG. 22 is a block diagram showing an information recording apparatus in an example of the present invention.

DESCRIPTION OF REFERENCE CODES

7, 100, 200 DVD drive apparatus
11 recording zone reservation device
12 user data recording control device
13 recording zone close device
14 read error data generation device
101 link-loss area formation device
201 read error data insertion device

BEST MODE FOR CARRYING OUT THE INVENTION

Hereinafter, the best mode for carrying out the invention will be explained in order in each embodiment with reference to the drawings.

First Embodiment

FIG. 1 shows a personal computer system in which a DVD drive apparatus is mounted, which is an information recording apparatus in a first embodiment of the present invention. As shown in FIG. 1, a personal computer system 1 is provided with: a personal computer main body 2; a keyboard 3; a mouse 4; and a display panel apparatus 5. The keyboard 3, the mouse 4, and the display panel apparatus 5 are connected to the personal computer main body 2 in the same method as that of the generally known personal computer system.

Inside the personal computer main body 2, a host device 6 and a DVD drive apparatus 7 are provided.

The host device 6 is an electronic circuit for controlling the personal computer system 1. The host device 6 is provided with general elements, circuits, or apparatuses, which constitute the basic device of the personal computer, such as a CPU (Central Processing Unit 9, a main storage memory, and a hard disk drive.

The DVD drive apparatus 7 is an apparatus for recording information, such as user data, onto a DVD 8 and for reading the information recorded on the DVD 8. The DVD drive apparatus 7 can read the information recorded on various DVDs, such as a DVD-ROM, a DVD-R, a DVD+R, a DVD-RW, a DVD+RW, and a DVD-RAM. Moreover, the DVD drive apparatus 7 can record the information onto various write-once type DVDs and rewritable DVDs, such as a DVD-R, a DVD+R, a DVD-RW, a DVD+RW, and a DVD-RAM. Incidentally, the following explanation exemplifies the case that the DVD 8 is a DVD-RW.

Inside the personal computer main body 2, the host device 6 and the DVD drive apparatus 7 are connected to and can communicate with each other, through a bus. The host device 6 can send data to be recorded onto the DVD 8, to the DVD drive apparatus 7. The DVD drive apparatus 7 can send the data read from the DVD 8, to the host device 6. Moreover, the host device 6 can send various commands for controlling the DVD drive apparatus 7, to the DVD drive apparatus 7. The DVD drive apparatus 7 operates in accordance with the command sent from the host device 6. Moreover, the DVD drive apparatus 7 can return a result of the operation or process, to the host device 6. For example, as a communication method between the host device 6 and the DVD drive apparatus 7, an ATAPI (AT Attachment Packet Interface) is used.

Incidentally, the DVD drive apparatus 7 in FIG. 1 is built in the personal computer main body 2; however, the present invention can be applied to an external DVD drive apparatus. Moreover, the DVD drive apparatus 7 in FIG. 1 is mounted in the personal computer system; however, the present invention can be also applied to a DVD drive apparatus mounted in a DVD recorder, a DVD drive apparatus mounted in a television provided with a program recording function, and a DVD drive apparatus mounted in a car navigation system.

Moreover, this embodiment, a second embodiment and a third embodiment, describe later, exemplify the case that the information recording is performed on the DVD 8 by the cooperation of the host device 6 and the DVD drive apparatus 7, which are hardware both separated. However, the present invention is not limited to this. The present invention can be also applied to a circuit or apparatus in which the functions or structures of the host device 6 and the DVD drive apparatus 7 are unified. For example, the CPU of the host device 6 and the CPU of the DVD drive apparatus 7 may be one CPU.

FIG. 2 shows the structure of the DVD drive apparatus 7. The DVD drive apparatus 7 adopts a recording method in which user data can be written once or additionally recorded, after the user data is once recorded. This recording method is referred to as an incremental recording method. The DVD drive apparatus 7 writes once the user data onto the DVD 8, in accordance with this recording method. Hereinafter, a process of writing once the user data onto the DVD 8 in accordance with the incremental recording method is referred to as a "write-once process".

That is, the DVD drive apparatus 7 performs the write-once process substantially in the following procedure. Firstly, a continuous area for writing once a group of user data is reserved in a data recording area on the DVD 8. Hereinafter, the group of user data is referred to as a "user data group", and the continuous area for writing once the user data is referred to as a "recording zone". Incidentally, the recording zone is sometimes referred to as a "RZone". Then, the user data group is recorded into the reserved recording zone. After the recording of the user data group is ended, the recording zone is closed. At this time, padding is performed if there is an area in which the user data is not recorded (hereinafter referred to as a "remaining area") in this time's recording process at the tail of the recording zone. Moreover, when the recording zone is closed and then a new recording zone is reserved to write once the user data group, the DVD drive apparatus 7 forms a link-loss area immediately after the closed recording zone. That is, the link-loss area is formed between the recording zone in which the user data group is recorded last time and the recording zone in which the user data group is recorded this time.

The user data is, for example, content data. The content data is, for example, data about movies, television programs, radio programs, music, sounds, text, and the like. The user data can include some or all of motion picture data, still picture data, audio data, subtitle data, text data, graphic data, control data, and the like.

As shown in FIG. 2, the DVD drive apparatus 7 is provided with: a recording zone reservation device 11; a user data recording control device 12; a recording zone close device 13; a link-loss area formation device 15; an interface 16; a buffer memory 17; a data transfer device 18; an encoding device 19; a recording head 20; a driving system 21; a driving control device 22; and a total control device 23. Moreover, the recording zone close device 13 is provided with a read error data generation device 14.

The recording zone reservation device 11 reserves the recording zone on the DVD 8. If read error data is to be recorded on the DVD 8, the recording zone reservation device 11 reserves the recording zone with a size obtained by totalizing the size of the user data group and the size of the read error data. If the read error data is not to be recorded on the DVD 8, the recording zone reservation device 11 reserves the recording zone with the same size as that of the user data group.

The user data recording control device 12 records the user data included in the user data group, into the recording zone reserved by the recording zone reservation device 11. The user data recording control device 12 can record all the user data included the user data group, continuously or by installments, into the recording zone, by the control of the host device 6 or the total control device 23. Moreover, the user data recording control device 12 can record the user data into the recording zone at a double recording speed or more, such as a 2-time, 4-time, 8-time, or 16-time recording speed. This high-speed recording can be realized in combination with high-speed data transfer of the user data between the buffer memory 17 and the encoding device 19.

The recording zone close device 13 performs the padding by recording padding data into the remaining area, which exists at the tail of the recording zone in which the write-once recording is ended by the user data recording control device 12, to thereby close the recording zone. The recording zone close device 13 can use the read error data as the padding data. The read error data is data that causes a read error when the user data is read from the DVD 8 by another apparatus (e.g. a DVD player). The recording zone close device 13 is provided with the read error data generation device 14. The read error data generation device 14 generates the read error data.

The link-loss area formation device 15 forms the link-loss area by recording link-loss data immediately after the recording zone closed by the recording zone close device 13.

The recording zone reservation device 11, the user data recording control device 12, the recording zone close device 13, the read error data generation device 14, the link-loss area formation device 15, and the total control device 23 are provided with an arithmetic processing apparatus, such as a CPU, and a semiconductor memory element, such as a ROM (Read Only Memory) and a RAM (Random Access Memory). For example in the ROM, a program is stored to realize the operations of the recording zone reservation device 11, the user data recording control device 12, the recording zone close device 13, the read error data generation device 14, the link-loss area formation device 15, and the total control device 23. The CPU reads the program from the ROM and executes it. When the CPU executes the program, the RAM is used as a working memory area.

The interface 16 connects the DVD drive apparatus 7 and the host device 6, to allow the communication therebetween. Specifically, the interface 16 receives the user data to be recorded onto the DVD 8, and various commands for controlling the DVD drive apparatus 7, from the host device 6. The interface 16 is, for example, an ATAPI interface circuit, and is connected to the bus disposed in the personal computer main body 2.

The buffer memory 17 temporarily stores therein the user data (a part or all of the user data group(s)). The buffer memory 17 is a volatile semiconductor memory element, such as a RAM.

The data transfer device 18 transfers the user data stored in the buffer memory 17, from the buffer memory 17 to the encoding device 19 in a high-speed data transfer method, such as a DMA (Direct Memory Access) method. The data transfer device 18 is provided with a DMA chip, for example.

The encoding device 19 encodes the user data. Specifically, the encoding device 19 performs EDC (Error Detection Code) encoding, ECC (Error Correcting Code) encoding, 8/16 modulation or the like, on the user data supplied from the buffer memory 17. The encoding device 19 is provided with, for example, an EDC encoder, an ECC encoder, an 8/16 modulation circuit, or the like.

The recording head 20 converts the user data and other information encoded by the encoding device 19, to a light beam, and irradiates the DVD 8 with this light beam. By this, the user data and the other information are recorded onto the DVD 8. The recording head 20 is, for example, an optical pickup. Incidentally, if the information recording medium is not an optical recording medium but a magnetic recording medium, the recording head 20 is provided with a magnetic head, for example.

The driving system 21 controls the rotation of the DVD 8, the displacement of the recording head 20 in the radial direction of the DVD 8, or the like. The driving system 21 is provided with a spindle motor for rotating the DVD 8, an actuator for displacing the recording head 20, and the like.

The driving control device 22 controls the driving system 21, under the control of the total control device 23. The driving control device 22 is provided with a servo control circuit, for example.

The total control device 23 controls the constituent elements 11 to 22 of the DVD drive apparatus 7. For example, the total control device 23 controls the operation timing of each element, the data transfer between the elements, and the like. Moreover, the total control device 23 generates a sector header, identifies and recognizes the various commands received from the host device 6, and the like.

Incidentally, the DVD drive apparatus 7 also has a structure (e.g. an 8/16 demodulation circuit) for reading the information, such as the user data, recorded on the DVD 8. For this structure, a known structure mounted in the DVD drive apparatus, which is already in the market, can be used.

FIG. 3 shows the structure of the recording area of the DVD 8. The embodiment, the second embodiment and the third embodiment, descried later, exemplify the DVD-RW as the DVD 8. As shown in FIG. 3, in the recording area of the DVD 8, there are formed: an R information area 31; a lead-in area 32; a data recording area 33; and a lead-out area 34, from the inner circumferential side to the outer circumferential side. In the R information area 31, a PCA (Power Calibration Area) 31A and a RMA (Recording Management Area) 31B are formed. The lead-in area 32 and the lead-out area 34 are areas to record therein control information and management information. In the data recording area 33, the user data is recorded.

FIG. 4 shows the write-once process of the DVD drive apparatus 7. For example, if a command to perform the write-once process is sent from the host device 6 to the DVD drive apparatus 7, the DVD drive apparatus 7 performs the write-once process shown in FIG. 4, in response to the command.

Firstly, the DVD drive apparatus 7 examines whether or not the DVD 8 is inserted in the DVD drive apparatus 7 (step S1). This examination is performed in the following procedure. Firstly, the DVD drive apparatus 7 receives a command to examine whether or not the DVD is inserted, from the host device 6. In accordance with the command, the total control device 23 of the DVD drive apparatus 7 examines whether or not the DVD 8 is inserted in the DVD drive apparatus 7. If the DVD 8 is inserted in the DVD drive apparatus 7 (the step S1: YES), the total control device 23 sends a signal indicating that the DVD is inserted, to the host device 6.

Then, the DVD drive apparatus 7 examines whether or not the DVD 8 inserted in the DVD drive apparatus 7 is already finalized (step S2). This examination is performed in the following procedure, for example. Firstly, the DVD drive apparatus 7 receives a command to examine whether or not the DVD is already finalized, from the host device 6. In response to this command, the total control device 23 examines whether or not the DVD 8 is already finalized. If the DVD 8 is not finalized (the step S2: NO), the total control device 23 sends a signal indicating that the DVD is not finalized, to the host device 6.

Then, the DVD drive apparatus 7 recognizes a position on the DVD 8 at which the write-once recording of the user data group is to be started (step S3). The position to start the write-once recording of the user data group is recognized in the following procedure, for example. Firstly, the DVD drive apparatus 7 receives a command to read recording management information recorded in the RMA of the DVD, from the host device 6. In accordance with the command, the total control device 23 reads the recording management information recorded in the RMA 31B of the DVD 8, and sends the recording management information to the host device 6. The host device 6 receives the recording management information. The recording management information includes a recording history in the data recording area 33 of the DVD 8. Specifically, the recording management information includes information indicating the head address of the recording zone that already exists in the data recording area 33 at the current time point, information indicating the address of the user data recorded last in the data recording area 33, or the like. The host device 6 calculates the head address of an unrecorded area in the data recording area 33 at the current time point, on the basis of the recording management information, and adds a size of the link-loss area to this address. The address obtained by this is the address at which the write-once recording of the user data group is to be started. The host device 6 sends the information indicating this address, to the DVD drive apparatus 7. The DVD drive apparatus 7 receives this information and recognizes (e.g. stores into the RAM or the like) the address indicated by the information. Incidentally, the size of a link-loss area 40 is, for example, a size of 1ECC block and specifically about 32 kilobytes.

Then, the DVD drive apparatus 7 reserves the recording zone on the DVD 8 (step S4). The recording zone is reserved in the following procedure, for example.

Firstly, the host device 6 calculates the size of the recording zone to be reserved. If the read error data is to be recorded onto the DVD 8, the host device 6 calculates the size of the recording zone by adding the size of the user data group to be written once and the size of the read error data. On the other hand, if the read error data is not to be recorded onto the DVD 8, the host device 6 regards the size of the user data group as the size of the recording zone.

Then, the host device 6 sends a command to reserve the recording zone on the DVD 8 (a reserve command) and information indicating the size of the recording zone (recording zone size information), to the DVD drive apparatus 7. The DVD drive apparatus 7 receives the reserve command and the recording zone size information, from the host device 6. The command and the information are sent to the recording zone reservation device 11 through the total control device 23. Then, the recording zone reservation device 11 reserves the recording zone with the size indicated by the recording zone size information, in the data recording area 33, in accordance with the reserve command.

By this, as shown in FIG. 6, a recording zone 42 is reserved in the data recording area 33. Incidentally, simultaneously with the reservation of the recording zone in the step S4, the link-loss area 40 is reserved immediately before the recording zone. That is, the recording zone 42 is reserved from the address at which the write-once recording of the user data group is to be started. As described above, the address at which the write-once recording of the user data group is to be started is obtained by adding the size of the link-loss area to the head address of the unrecorded area in the data recording area 33 at the current time point. Therefore, by reserving the recording zone from the address at which the write-once recording of the user data group is to be started, an unrecorded area between the head address of the unrecorded area in the data recording area 33 and immediately before the address at which the write-once recording of the user data group is to be started is reserved as the link-loss area.

Then, the DVD drive apparatus 7 records the link-loss data into the link-loss area reserved in the step S4 in FIG. 4, and then records the user data group into the recording zone reserved in the step S4 (steps S5 and S6).

The link-loss data and the user data group are recorded in the following procedure, for example.

Firstly, the DVD drive apparatus 7 receives the user data included in the user data group and a command to record the user data into the recording zone (a writing command), from the host device 6. The received writing command is sent to the user data recording control device 12 through the total control device 23. Moreover, the received user data is stored into the buffer memory 17.

Only when the first writing command is received, the link-loss area formation device 15 records the link-loss data into the link-loss area, under the control of the total control device 23.

The user data recording control device 12 records the user data stored in the buffer memory 17, into the recording zone, in accordance with the writing command. That is, the user data recording control device 12 controls the constituent elements that are necessary for the recording of the user data, such as the buffer memory 17, the data transfer device 18, the encoding device 19, the recording head 20, and the driving control device 22. Under the control of the user data recording control device 12, the user data stored in the buffer memory 17 is transferred by the data transfer device 18 to the encoding device 19, is encoded by the encoding device 19, is supplied to the recording head 20, and is recorded into the recording zone by the irradiation of the light beam from the recording head 20. Such processes are repeated until the recording of all the user data included in the user data group is ended (step S7).

The transfer of the user data from the buffer memory 17 to the encoding device 19, which is performed by the data transfer device 18, adopts the DMA method, for example. Thus, the transfer of the user data is high-speed, and the encoding process by the encoding device 19 is also high-speed. Moreover, under the control of the user data recording control device 12, the recording head 20 can record the user data into the recording zone at a double recording speed or more. As a result, in the step S6 and the step S7, the DVD drive apparatus 7 can record all the user data included in the user data group, continuously into the recording zone, at the double recording speed or more.

Then, the user data recording control device 12 of the DVD drive apparatus 7 records all the remaining user data stored in the buffer memory 17, into the recording zone to empty the buffer memory 17 (step S8). This process is performed in accordance with a synchronize cache command issued from the host device 6.

In the step S5 to the step S8, as shown in FIG. 7, link-loss data 41 is recorded continuously into the link-loss area 40. Then, a user data group 43 is recorded continuously into the recording zone 42.

Then, the DVD drive apparatus 7 performs a recording zone close process (step S9).

FIG. 5 shows the recording zone close process. The recording zone close process is performed in the procedure shown in FIG. 5, for example. Firstly, the DVD drive apparatus 7 receives a command to perform the recording zone close process (a close command), from the host device 6. The close command is sent to the recording zone close device 13 through the total control device 23. The recording zone close device 13, which has received the close command, starts the recording zone close process.

Firstly, the recording zone close device 13 examines whether or not there is the remaining area in the recording zone (step S21 in FIG. 5). If the read error data is to be recorded onto the DVD 8, the size of the recording zone reserved in the step S5 in FIG. 4 is a size obtained by totalizing the size of the user data group and the size of the read error data. Thus, as shown in FIG. 7, after the user data group 43 is recorded into the recording zone 42, a remaining area 44 is left at the tail of the recording zone 42. The size of the remaining area 44 is the same as that of the read error data. On the other hand, if the read error data is not to be recorded onto the DVD 8, the size of the recording zone reserved in the step S5 in FIG. 4 is the same as that of the user data group. In this case, since the size of the recording zone is the same as that of the user data group, the remaining area should not be left at the tail of the recording zone after the user data group is recorded into the recording zone. However, actually, the size of the recording zone is calculated to be an integral multiple of the ECC block, so that the remaining area with less than the ECC block size is left at the tail of the recording zone when the size of the recording zone is not an integral multiple of the ECC block.

If there is the remaining area in the recording zone (the step S21 in FIG. 5: YES), then the recording zone close device 13 judges whether or not to record the read error data into the remaining area 44 (step S22). This judgment is performed in the following procedure, for example. The close command sent from the host device 6 to the DVD drive apparatus 7 has information appended which indicates whether or not to record the read error data. For example, a read error data recording flag indicating whether or not to record the read error data is appended to the close command. The recording zone close device 13 receives the close command and the read error data recording flag, through the total control device 23. Then, the recording zone close device 13 judges whether or not to record the read error data, on the basis of the read error data recording flag.

If the read error data is to be recorded (the step S22: YES), the read error data generation device 14 generates the read error data (step S23). The structure and generation method of read error data will be described later.

Then, the recording zone close device 13 performs the padding by recording the padding data into the remaining area (step S24). In the step S24, the recording zone close device 13 uses the read error data generated in the step S23, as the padding data. By this, as shown in FIG. 8, read error data 45 is recorded into the remaining area. That is, the read error data 45 is recorded into an area between immediately after the user data group 43 and the end of the recording zone 42.

On the other hand, if the read error data is not to be recorded (the step S22 in FIG. 5: NO), the recording zone close device 13 generates normal padding data (step S25), and performs the padding by recording the normal padding data into the remaining area (step S26). By this, the normal padding data is recorded into the remaining area.

Incidentally, the normal padding data is, for example, zero data. Moreover, an error detection code of each of sectors which constitute the normal padding data is a correct value. Furthermore, a PI/PO error correction code of each of ECC blocks which constitute the normal padding data is a correct value. The normal padding data has such a structure that the read error is not generated even if the normal padding data is read by another apparatus (e.g. DVD player).

After the padding is ended, the recording zone close device 13 records a history of the user data group recorded by this time's write-once process, as the recording management information, into the RMA 31B (step S27). For example, the recording zone close device 13 records the head address of the recording zone formed this time and the address of the user data recorded last into the recording zone, into the RMA 31B.

On the other hand, if the read error data is not to be recorded onto the DVD 8, in some cases, the size of the recording zone reserved in the step S5 in FIG. 4 is equal to that of the user data group. In this case, there is no remaining area in the recording zone after the user data group is recorded When there is no remaining area in the recording zone (the step S21: NO), the recording zone close device 13 skips the step S22 to the step S26, and immediately performs the step S27.

Back in FIG. 4, the total control device 23 of the DVD drive apparatus 7 judges whether or not to end the write-once process (step S10). For example, as shown in FIG. 9, if the plurality of user data groups are recorded continuously into the data recording area 33, the DVD drive apparatus 7 continuously performs the write-once process about one user data group and then continuously performs the write-once process about a next user data group. When the write-once process is to be continued in this situation, the total control device 23 judges that the write-once process is to be ended (the step S10: NO). In this case, the process of the DVD drive apparatus 7 returns to the step S3.

On the other hand, for example, if there is no user data group to be written once next, it is judged that the write-once process is to be ended (the step S10: YES). By this, the write-once process of the DVD drive apparatus 7 is ended.

Moreover, in the step S1, as a result that the total control device 23 examines whether or not the DVD 8 is inserted in the DVD drive apparatus 7, if the DVD 8 is not inserted in the DVD drive apparatus 7 (the step S1: NO), the total control device 23 sends a signal indicating that the DVD is not inserted, to the host device 6. By this, the write-once process of the DVD drive apparatus 7 is ended.

Moreover, in the step S2, as a result that the total control device 23 examines whether or not the DVD 8 is already finalized, if the DVD 8 is already finalized (the step S2: YES), the total control device 23 sends a signal indicating that the DVD is already finalized, to the host device 6. By this, the write-once process of the DVD drive apparatus 7 is ended.

FIG. 10 shows the structure of the read error data. As shown in FIG. 10, the read error data 45 is provided with e.g. a plurality of ECC blocks 51. Incidentally, the read error data may be provided with one ECC block. Nevertheless, the read error data is desirably provided with about two to five ECC blocks. By this, the read error can be generated certainly, and the recording area to be used for the recording of the user data group can be reserved widely in the data recording area 33.

FIG. 11 shows the structure of one ECC Block 51 included in the read error data 45. As shown in FIG. 11, each of the ECC blocks 51 which constitute the read error data 45 is provided with a main data portion 52 and an error correction code portion 53. The individual data which constitute the main data portion 52 is, for example, zero data. The individual data which constitute the error correction code portion 53 is, for example, the PI/PO error correction code.

However, the PI/PO error correction code of each of the ECC blocks 51 which constitute the read error data 45 is not a correct value. That is, a different value from the value derived from a calculation for generating the PI/PO error correction code is described in the error correction code portion 53 of each of the ECC blocks 51 which constitute the read error data 45. The value described in the error correction code portion 53 is, for example, zero, a random code, "FF", or the like.

The read error data generation device 14 generates each of the ECC blocks 51 which constitute the read error data 45, in the following procedure, for example. Firstly, the read error data generation device 14 forms the main data portion 52, using data prepared to be used as the padding data (e.g. zero data recorded on the ROM). Then, the read error data generation device 14 appends the PI/PO error correction code, which is not a correct value, to the main data portion 52.

If the read error data 45 is provided with the plurality of ECC blocks 51 as shown in FIG. 10, the PI/PO error correction code, which is not a correct value, may be appended to all the ECC blocks 51. Alternatively, one or some of the ECC blocks 51 may be selected from the plurality of ECC blocks which constitute the read error data 45, and the PI/PO error correction code, which is not a correct value, may be appended only to the selected ECC blocks 51.

On the other hand, the read error data can be generated not only by the method of appending the PI/PO error correction code, which is not a correct value but also by a method of appending an error detection code (EDC), which is not a correct value. FIG. 12 shows the structure of one sector included in the read error data 45. As shown in FIG. 12, each of sectors 60 which constitute the read error data 45 includes: sector ID data 61; an ID error detection code (IDE) 62; copyright management information (CPR_MAI) 63; main data 64; and an error detection code (EDC) 65. The main data 64 is, for example, zero data. The error detection code 65 is not a correct value. That is, the error detection code 65 is different from the value derived from a calculation for generating the error detection code, and it is, for example, zero, a random code, "FF", or the like.

The read error data generation device 14 generates the read error data by appending the error detection code 65, which is not a correct value, to the sector ID data 61, the ID error detection code 62, the copyright management information 63, and the main data 64.

As shown in FIG. 10, the read error data 45 includes one or more ECC blocks 51. In general, one ECC block includes 16 sectors. Therefore, the read error data 45 includes a plurality of sectors. The error detection code, which is not a correct value, may be appended to all the sectors which constitute the read error data 45. Alternatively, one or some of the sectors may be selected from the sectors which constitute the read error data 45, and the error detection code, which is not a correct value, may be appended only to the selected sectors.

FIG. 13 shows the process of the host device 6, which is performed to make the DVD drive apparatus 7 perform the write-once process. For example, if a user operates the keyboard 3 or the mouse 4 and inputs an instruction to record the user data onto the DVD 8, to the personal computer main body 2, the host device 6 responds to this and performs the process shown in FIG. 13.

Firstly, the host device 6 performs authoring of the user data (an authoring process: step S31). For example, if the user data is a less than 2-hour movie content data and the size of the user data is large, the host device 6 divides the user data into several user data groups. Then, the host device 6 determines the arrangement of the user data groups, in view of the insertion of the read error data and the link-loss data between the user data groups.

Then, the host device 6 confirms the DVD 8 (step S32). That is, the host device 6 sequentially sends the command to examine whether or not the DVD 8 is inserted in the DVD drive apparatus 7 and the command to examine whether or not the DVD 8 inserted in the DVD drive apparatus 7 is already finalized, to the DVD drive apparatus 7. Then, the host device 6 receives the signals sequentially given back from the DVD drive apparatus 7, in response to the commands.

Then, the host device 6 obtains the position at which the write-once recording is to be started (step S33). That is, the host device 6 sends the command to read the recording management information recorded in the RMA 31B of the DVD 8, to the DVD drive apparatus 7. Then, the host device 6 receives the recording management information sent from the DVD drive apparatus 7, in response to this command. Then, the host device 6 calculates the head address of the unrecorded area in the data recording area 33 at the current time point, on the basis of the recording management information, adds the size of the link-loss area to this, and sends information indicating the address obtained as a result, to the DVD drive apparatus 7.

Then, the host device 6 calculates the size of the recording zone (size calculation process: step S34). If the read error data is to be recorded onto the DVD 8, the size of the recording zone is a size obtained by totalizing the size of the user data group to be written once and the size of the read error data. On the other hand, if the read error data is not to be recorded onto the DVD 8, the size of the recording zone is the same as that of the user data group.

Then, the host device 6 sends the reserve command and the recording zone size information, to the DVD drive apparatus 7 (step S35).

Then, the host device 6 sends the writing command and the user data, to the DVD drive apparatus 7 (step S36). The transmission of the writing command and the user data is repeated until all the user data included in the user data group is sent to the DVD drive apparatus 7 (step S37).

After all the user data included in the user data group is sent to the DVD drive apparatus 7, the host device 6 sends a command to empty the buffer memory 17 of the DVD drive apparatus 7 (e.g. synchronize cache command), to the DVD drive apparatus 7 (step S38).

Then, the host device 6 sends the close command to the DVD drive apparatus 7 (step S39). To the close command, the read error data recording flag indicating whether or not to record the read error data is appended. For example, if the read error data is to be recorded onto the DVD 8, "1" is appended as the read error data recording flag. If the read error data is not to be recorded onto the DVD 8, "0" is appended as the read error data recording flag.

Then, the host device 6 judges whether or not to end the process in order to make the DVD drive apparatus 7 perform the write-once process (step S40). If the plurality of user data groups are recorded continuously into the data recording area 33, the host device 6 judges that the process is not to be ended in order to make the DVD drive apparatus 7 perform the write-once process (the step S40: NO). In this case, the process returns to the step S33. On the other hand, if the write-once recording of all the user data groups is ended, the host device 6 judges that the process is to be ended in order to make the DVD drive apparatus 7 perform the write-once process (the step S40: YES). By this, the process is ended in order to make the DVD drive apparatus 7 perform the write-once process.

FIG. 14 shows the data format of a DVD video. The read error data recorded in the recording zone by the write-once process, is skipped upon reproduction. This mechanism will be explained using FIG. 14.

If the user data recorded in the recording zone in the recording data area 33 is DVD video data, the user data is formed in a data format shown in FIG. 14. That is, the user data includes a video zone 71, and the video zone 71 includes a video manager (VMG) 72 and video title sets (VTS) 73. The video title set 73 includes: video title set information (VTSI) 75; a video object set for menu (VOBS for Menu) 76; a video object set for title (VOBS for Title) 77; and video title set information backup 78. A video object (VOB) 81 included in the video object set for title 77 includes a plurality of cells 82. Each cell 82 includes motion picture data, still picture data, audio data, or the like.

On the other hand, the video title set information 75 includes a program chain 84. The program chain 84 includes a list (program control block: PCB) on which cell pointers 85 are arranged in accordance with a reproduction order. The cell pointer 85 is information indicating the position of the cell 82. The program chain 84 determines the reproduction order of the cell 82.

The program chain 84 allows the selection of the cell 82 to be reproduced and the cell 83 not to be reproduced. That is, by describing only the pointer cell 85 that indicates the cell 82 to be reproduced in the program chain 84, it is possible to reproduce only the cell 82 to be reproduced, and to skip the cell 82 not to be reproduced. For example, as shown in FIG. 14, the cell pointers 85 indicating the cells #1, #2, #4 and #5 are described in the program chain 84. By this, it is possible to reproduce only the cells #1, #2, #4 and #5, and to skip the cells #3 and #6.

By the way, a legal reproducing apparatus, such as a DVD player, sold in a general market reads and reproduces the cells, in accordance with the program chain. The legal reproducing apparatus reads only the cells indicated by the cell pointers of the program chain. That is, the legal reproducing apparatus does not read but skips the cells that are not indicated by the cell pointers of the program chain.

The host device 6 forms one cell by the link-loss data 41 in FIG. 9, one or a plurality of cells by the user data group 43, and one or a plurality of cells by the read error data 44. Moreover, the host device 6 prepares the program chain in which only the cell pointers indicating the cells formed by the user data group 43 are arranged. That is, the host device 6 prepares the program chain not to include the cell pointers indicating the cells formed by the link-loss data 41 nor the cell pointers indicating the cells formed by the read error data 44. Then, the host device 6 records the program chain prepared in this manner, onto the DVD 8 through the DVD drive apparatus 7.

When the legal reproducing apparatus performs the reproduction on the DVD 8, the legal reproducing apparatus reads the program chain recorded on the DVD 8. Then, the legal reproducing apparatus reads and reproduces only the cells formed by the user data group 43 in accordance with this program chain. That is, the legal reproducing apparatus does not read but skips the cells formed by the link-loss data 41 and the cells formed by the read error data 44. Since the legal reproducing apparatus does not read the cells formed by the read error data 44, the read error is not generated in the reading process of the legal reproducing apparatus as long as an abnormal situation does not occur, such as a scratch on the recording surface of the DVD 8.

However, if it is tried to copy the DVD 8, the read error occurs on a reading apparatus used for the copy operation. For example, if all the data recorded on the DVD 8 or files recorded on the DVD 8 are read by the reading apparatus and are recorded onto another recording medium, the reading apparatus does not perform the reading process in accordance with the program chain. Thus, the reading apparatus attempts to read the read error data. As a result, the read error occurs on the reading apparatus. If the read error occurs, the reading process stops on the reading apparatus. As a result, the attempt of copying the DVD 8 ends up in failure.

As explained above, on the DVD drive apparatus 7, by the recording zone reservation device 11, the recording zone with the size obtained by totalizing the size of the user data group to be written once and the size of the read error data is reserved, and the read error data is recorded into the recording zone using the padding by the recording zone close device 13. By this, it is possible to record the read error data into the data recording area 33 of the DVD 8. Moreover, since the read error data is recorded into each recording zone, if a plurality of recording zones are formed in the data recording area 33, the read error data is recorded in a plurality of places in the data recording area 33. Moreover, since the read error data is recorded in a small area located at the tail of the recording zone (e.g. an area with a size corresponding to 2 to 5 ECC blocks), if the plurality of recording zones are formed in the data recording area 33, the read error data is discretely disposed in the data recording area 33. By this, it is possible to generate the read error certainly on the reading apparatus used for the operation of copying the DVD 8. Moreover, since the read error data is discretely disposed, a copier hardly finds the read error data. Therefore, it is possible to enhance the copy prevention of the user data (content data) recorded on the DVD 8.

Moreover, on the DVD drive apparatus 7, by the recording zone reservation device 11, the recording zone with the size obtained by totalizing the size of the user data group to be written once and the size of the read error data is reserved, and the read error data is recorded into the recording zone using the padding by the recording zone close device 13. By this, with hardly blocking the process of recording the user data group onto the DVD 8, the copy prevention structure (the structure that the plurality of read error data is discretely disposed in the data recording area 33) can be made on the DVD 8.

That is, the generation of the copy prevention structure can be also realized by interrupting the process of reading the read error data into the process of recording the user data group. However, according to this method, the process of recording the user data group is discontinued in each interrupt of the process of reading the read error data. This deteriorates the efficiency of the process of recording the user data group, which possibly reduces the speed of the process of recording the user data group. In particular, in the case that it is tried to realize the high-speed recording of the user data by the DMA transfer of the user data between the buffer memory and the encoding device, if the method of interrupting the process of recording the read error data is adopted, the effect of the high-speed recording of the user data possibly does not produce a sufficient effect.

In contrast, on the DVD drive apparatus 7, the read error data is recorded into the recording zone using the padding in the recording zone close, to thereby generate the copy prevention structure. The padding in the recording zone close is performed after the process of recording the user data group. Therefore, the process of recording the user data group is not discontinued by the interrupt of the process of recording the read error data. Thus, according to the DVD drive apparatus 7, it is possible to realize the generation of the copy prevention structure while preventing the deterioration of the efficiency of the process of recording the user data group and preventing the reduction in the speed of the process of recording the user data group.

In particular, according to the DVD drive apparatus 7, since the copy prevention structure can be made on the DVD 8 with hardly blocking the process of recording the user data group onto the DVD 8, it is possible to realize both the high-speed recording of the user data group onto the DVD 8 and the generation of the copy prevention structure. That is, according to the DVD drive apparatus 7, since the process of recording the user data group is not discontinued by the interrupt of the process of recording the read error data, it is possible to continuously perform the DMA transfer of the user data between the buffer memory and the encoding device and to continuously perform the high-speed recording of the user data into the recording zone at a double recording or more by the recording head 20. Then, after the high-speed continuous recording for the recording zone, the read error data can be recorded into the recording zone. By this, it is possible to realize the generation of the copy prevention structure while exerting a sufficient effect of the high-speed recording of the user data group onto the DVD 8.

Moreover, on the DVD drive apparatus 7, the read error data is recorded into the recording zone, using the padding by the recording zone close device 13. The process of recording the read error data using the padding can be realized by a simple structure, such as placing the flag indicating whether or not to record the read error data in the close command, which is sent from the host device 6 to the DVD drive apparatus 7. That is, according to the DVD drive apparatus 7, it is possible to easily realize the generation of the copy prevention structure.

Moreover, on the DVD drive apparatus 7, as shown in FIG. 10 and FIG. 11, the read error data 45 is generated by making the PI/PO error correction code of the ECC block 51 have a different value from the correct value. Alternatively, as shown in FIG. 10 and FIG. 12, the read error data 45 is generated by making the error detection code of the sector have a different value from the correct value. By this it is possible to prevent the occurrence of disadvantages, such as a disadvantage that the tracking is off during the reading of the user data and a disadvantage that the user data to be reproduced cannot be read correctly, on the legal reproducing apparatus.

That is, there are following three methods to cause the read error on the reading apparatus used for the copy operation. The first method is to form several unrecorded areas (unrecorded cells) with a size corresponding to a size of 2 to 5 ECC blocks, in the data recording area 33. The second method is to record the data double into the area with the size corresponding to the size of 2 to 5 ECC blocks and to form several such areas (double recording cells) in the data recording area 33. This method is efficient if the information recording medium is a write-once type recording medium, such as a DVD-R. The third method is to make the error correction code or the error detection code of the data recorded in the area with the size corresponding to the size of 2 to 5 ECC blocks have a different value from the correct value and to form several such areas (false code cells) in the data recording area 33.

In the first method, the tracking is possibly off because the light beam irradiated from the recording head (optical pickup) enters the unrecorded cell when the user data included in the cells previous or next to the unrecorded cell on the legal reproducing apparatus. Such a disadvantage possibly occurs on the reproducing apparatus that adopts a DPD (Differential Phase Detection) method as the tracking method.

In the second method, there is a possibility that the user data included in the cell disposed immediately after the double recording cell cannot be correctly read in the data recording area of the DVD. This is because the data double recording adversely influences the cell disposed immediately after the double recording cell, to thereby possibly produce a distortion in a reproduction signal obtained from the cell disposed immediately after the double recording cell.

In the third method, the data is recorded normally, except the error correction code and the error detection code. Therefore, there is no such disadvantage that the tracking is off even if the light beam enters the false code cell. Moreover, there is no such disadvantage that the user data included in the cell disposed immediately after the false code cell cannot be read correctly.

The DVD drive apparatus 3 adopts the third method. Therefore, on the legal reproducing apparatus, there is no such disadvantage that the tracking is off during the reading of the user data, nor the disadvantage that the user data to be reproduced cannot be read correctly.

Second Embodiment

FIG. 15 shows a DVD drive apparatus in a second embodiment of the information recording apparatus of the present invention. Incidentally, in a DVD drive apparatus 100 in FIG. 15, the same constituent elements as those of the DVD drive apparatus 7 in FIG. 2 carry the same numerical references, and the explanation thereof will be omitted.

The DVD drive apparatus 100 in FIG. 15 does not record the read error data onto the DVD using the padding in the recording zone close, but records the read error data onto the DVD using the formation of the link-loss area.

That is, a link-loss area formation device 101 uses the read error data as the link-loss data when recording the link-loss data onto the DVD to form the link-loss area. Moreover, the link-loss area formation device 101 is provided with a read error data generation device 102 for generating the read error data.

Incidentally, on the DVD drive apparatus 100, a recording zone reservation device 103 reserves the recording zone with a size of the user data group to be written once, on the DVD, whether or not the read error data is to be recorded on to the DVD.

Moreover, a recording zone close device 104 performs the padding on the recording zone using the normal padding data, whether or not the read error data is to be recorded on to the DVD.

FIG. 16 shows the write-once process of the DVD drive apparatus 100. For example, if the command to perform the write-once process is sent from the host device 6 to the DVD drive apparatus 100, the DVD drive apparatus 100 performs the write-once process shown in FIG. 16, in response to the command.

Firstly, the DVD drive apparatus 100 examines whether or not the DVD is inserted in the DVD drive apparatus 100 (step S51). This step is the same as the step S1 in FIG. 4.

Then, the DVD drive apparatus 100 examines whether or not the DVD inserted in the DVD drive apparatus 100 is already finalized (step S52). This step is the same as the step S2 in FIG. 4.

Then, the DVD drive apparatus 100 recognizes a position on the DVD at which the write-once recording of the user data group is to be started (step S53). This step is the same as the step S3 in FIG. 4.

Then, the recording zone reservation device 103 of the DVD drive apparatus 100 reserves the recording zone on the DVD (step S54). The recording zone reservation device 103 reserves the recording zone with the same size as that of the user data group to be written once, on the DVD, whether or not the read error data is to be recorded on to the DVD. Except this point, the procedure of reserving the recording zone is the same as that in the step S4 in FIG. 4.

In a step S54, simultaneously with the reservation of the recording zone, the link-loss area is reserved immediately before the recording zone.

Then, the procedure of reserving the DVD drive apparatus 100 records the link-loss data into the link-loss area reserved in the step S54, and then records the user data group into the recording zone reserved in the step S54 (steps S55 and S56).

The link-loss data and the user data group are recorded in the following procedure, for example. Firstly, the DVD drive apparatus 100 receives the user data included in the user data group and the writing command, from the host device 6. The received writing command is sent to the user data recording control device 12 through the total control device 23. Moreover, the received user data is stored into the buffer memory 17.

Only when the first writing command is received, the link-loss area formation device 15 performs a link-loss area formation process, under the control of the total control device 23.

FIG. 17 shows the link-loss area formation process on the DVD drive apparatus 100. The link-loss area formation process is performed in the procedure shown in FIG. 17, for example.

Firstly, the link-loss area formation device 101 judges whether or not to record the read error data into the link-loss area (step S71). This judgment is performed in the following procedure, for example. The writing command firstly sent from the host device 6 to the DVD drive apparatus 100 has information appended which indicates whether or not to record the read error data. For example, the read error data recording flag indicating whether or not to record the read error data is appended to the first writing command. The link-loss area formation device 101 receives the first writing command and the read error data recording flag, through the total control device 23. Then, the link-loss area formation device 101 judges whether or not to record the read error data, on the basis of the read error data recording flag.

If the read error data is to be recorded (the step S71: YES), the read error data generation device 102 generates the read error data (step S72). The size of the read error data generated here is a size of 1ECC block. Except this point, the structure and generation method of the read error data are the same as in the case of the DVD drive apparatus 7.

Then, the link-loss area formation device 101 forms the link-loss area by recording the link-loss data into the data recording area of the DVD (step S73). In the step S73, the link-loss area formation device 101 uses the read error data generated in the step S72, as the link-loss data. By this, the read error data is recorded into the link-loss area. That is, the read error data is recorded between the recording zone that is already in the data recording area of the DVD and the recording zone that will be formed from now.

On the other hand, if the read error data is not to be recorded (the step S71: NO), the link-loss area formation device 101 generates the normal link-loss data (step S74), and forms the link-loss area by recording the normal link-loss data into the data recording area of the DVD (step S75).

Incidentally, the normal link-loss data is, for example, zero data. Moreover, the error detection code of each of the sectors which constitute the normal link-loss data is a correct value. Furthermore, the PI/PO error correction code of each of ECC Blocks which constitute the normal link-loss data is a correct value. The normal link-loss data has such a structure that the read error is not generated even if the normal link-loss data is read by another apparatus (e.g. DVD player).

Then, the user data recording control device 12 records the user data stored in the buffer memory 17, into the recording zone, in accordance with the writing command. The process of recording the user data is repeated until the recording of all the user data included in the user data group is ended (the step S57 in FIG. 16). As in the DVD drive apparatus 7, the process of recording the user data is performed continuously at the double recording speed or more.

Then, the user data recording control device 12 of the DVD drive apparatus 100 records all the remaining user data stored in the buffer memory 17, into the recording zone to empty the buffer memory 17 (step S58). This process is performed in accordance with the synchronize cache command issued from the host device 6.

Then, the recording zone close device 104 of the DVD drive apparatus 100 closes the recording zone (step S59). That is, the recording zone close device 104 performs the padding by recording the padding data into the remaining area, which exists at the tail of the recording zone in which the recording of the user data group is ended, to thereby close the recording zone. The recording zone close device 104 uses the normal padding data as the padding data, whether or not the read error data is to be recorded onto the DVD. The process of closing the recording zone in this step is the same as the steps S21, S25, S26, and S27 in FIG. 5.

Then, the DVD drive apparatus 100 judges whether or not to end the write-once process (step S60). If the write-once recording is to be continued, such as the case that there is the user data group to be written once next, the DVD drive apparatus 100 judges that the write-once process is not to be ended (step S60: NO). In this case, the process of the DVD drive apparatus 100 returns to the step S53. On the other hand, if there is no user data group to be written once next, the DVD drive apparatus 100 judges that the write-once process is to be ended (step S60: YES). By this, the write-once process of the DVD drive apparatus 100 is ended.

Incidentally, one cell is formed of the link-loss area in which the read error data is recorded, and this cell is regarded as the cell not to be reproduced, by the program chain.

As explained above, on the DVD drive apparatus 100, the read error data is recorded into the data recording area of the DVD, using the formation of the link-loss area by the link-loss area formation device 101. Since the link-loss area is formed immediately before the recording zone, if a plurality of recording zones are formed in the data recording area, a plurality of link-loss areas are formed in the data recording area, and moreover, each link-loss area is discretely disposed in the data recording area. Therefore, if the read error data is recorded in each link-loss area, the read error data is discretely disposed in the data recording area. By this, it is possible to cause the read error certainly, on the reading apparatus used for the copy operation of the DVD. Therefore, it is possible to enhance the copy prevention of the user data (content data) recorded on the DVD.

Moreover, on the DVD drive apparatus 100, the read error data is recorded into the data recording area of the DVD, using the formation of the link-loss area by the link-loss area formation device 101. By this, with hardly blocking the process of recording the user data group onto the DVD, the copy prevention structure (the structure that the plurality of read error data is discretely disposed in the data recording area) can be made on the DVD. That is, the link-loss area is formed before the start of the process of recording the user data group. Therefore, the process of recording the user data group is not discontinued by the interrupt of the process of recording the read error data. Therefore, according to the DVD drive apparatus 100, it is possible to realize the generation of the copy prevention structure while preventing the deterioration of the efficiency of the process of recording the user data group and preventing the reduction in the speed of the process of recording the user data group.

Moreover, according to the DVD drive apparatus 100, since the copy prevention structure can be made on the DVD with hardly blocking the process of recording the user data group onto the DVD, it is possible to realize both the high-speed recording of the user data group onto the DVD and the generation of the copy prevention structure.

Moreover, on the DVD drive apparatus 100, the read error data is generated by making the PI/PO error correction code of the ECC block have a different value from the correct value. Alternatively, the read error data is generated by making the error detection code of the sector have a different value from the correct value. By this it is possible to prevent the occurrence of disadvantages, such as a disadvantage that the tracking is off during the reading of the user data and a disadvantage that the user data to be reproduced cannot be read correctly, on the legal reproducing apparatus.

Third Embodiment

FIG. 18 shows a DVD drive apparatus in a third embodiment of the information recording apparatus of the present invention. Incidentally, in a DVD drive apparatus 200 in FIG. 18, the same constituent elements as those of the DVD drive apparatus 7 in FIG. 2 or the DVD drive apparatus 100 in FIG. 15 carry the same numerical references, and the explanation thereof will be omitted.

The DVD drive apparatus 200 in FIG. 18 does not use the padding in the recording zone close nor the formation of the link-loss area, but inserts the read error data into the user data group to be recorded into the recording zone.

That is, a read error data insertion device 201 interrupts the process of recording the user data while the user data recording control device 12 records the user data included in the user data group into the recording zone, and records the read error data into the recording zone. By this, the read error data is inserted into the user data group. Moreover, the read error data insertion device 201 is provided with a read error data generation device 202. The read error data generation device 202 generates the read error data.

The read error data insertion device 201 is provided with an arithmetic processing apparatus, such as a CPU, and a semiconductor memory element, such as a ROM (Read Only Memory) and a RAM (Random Access Memory). For example in the ROM, a program is stored to realize the operations of the read error data insertion device 201. The CPU reads the program from the ROM and executes it.

FIG. 19 and FIG. 20 show the write-once process of the DVD drive apparatus 200. For example, if the command to perform the write-once process is sent from the host device 6 to the DVD drive apparatus 200, the DVD drive apparatus 200 performs the write-once process shown in FIG. 19 and FIG. 20, in response to the command.

Firstly, the DVD drive apparatus 200 examines whether or not the DVD is inserted in the DVD drive apparatus 200 (step S81). This step is the same as the step S1 in FIG. 4.

Then, the DVD drive apparatus 200 examines whether or not the DVD inserted in the DVD drive apparatus 200 is already finalized (step S82). This step is the same as the step S2 in FIG. 4.

Then, the DVD drive apparatus 200 recognizes a position on the DVD at which the write-once recording of the user data group is to be started (step S83). This step is the same as the step S3 in FIG. 4.

Then, the recording zone reservation device 103 of the DVD drive apparatus 200 reserves the recording zone on the DVD (step S84). The size of the recording zone reserved in this step has a value obtained by totalizing (1) the size of the user data group to be written once, (2) a value obtained by multiplying the number of the read error data to be inserted into the user data group by the size of one read error data (constant), and (3) a value obtained by multiplying the number of the link-loss areas formed in the user data group by the size of one link-loss area (constant). Except that the size of the recording zone is calculated in this manner, the procedure of reserving the recording zone is the same as the step S4 in FIG. 4.

In the step S84, simultaneously with the reservation of the recording zone, the link-loss area is reserved immediately before the recording zone.

Then, the DVD drive apparatus 200 records the link-loss data into the link-loss area, and then record one portion of the user data block included in the user data group, i.e. the first user data block, into an area located at the head of the recording zone (steps S85 and S86). The link-loss data and the user data group in this step are recorded in the following procedure, for example. Firstly, the host device 6 divides the user data included in the user data group, into a plurality of user data blocks. Then, the host device 6 sends the first user data block and the writing command, to the DVD drive apparatus 200. The DVD drive apparatus 200 receives the first user data block and the writing command. The received writing command is sent to the user data recording control device 12 through the total control device 23. Moreover, the received first user data block is stored into the buffer memory 17. Then, the link-loss area formation device 15 records the link-loss data into the link-loss area reserved in the step S84, under the control of the total control device 23. Then, the user data recording control device 12 records the first user data block stored in the buffer memory 17, into the recording zone, in accordance with the writing command.

Then, the user data recording control device 12 of the DVD drive apparatus 200 performs a process of ending the recording of the first user data block, in accordance with the synchronize cache command issued from the host device 6 (step S87). By this process, the entire remaining first user data block stored in the buffer memory 17, is recorded into the recording zone, to thereby empty the buffer memory 17.

After this, the recording history of the first user data block is recorded into the RMA of the DVD. Specifically, the address of the user data recorded last in the process of recording the first user data block is recorded into the RMA of the DVD. Incidentally, re-recording into the RMA in each updating of the RMA information is a redundant operation. Thus, instead of this method, the information to be recorded into the RMA may be stored in the RAM or the like on the DVD drive apparatus side.

Then, as shown in FIG. 20, the DVD drive apparatus 200 recognizes a position on the DVD to start the recording of the second user data block or the read error data (step S88). The procedure of recognizing the recording start position in this step is substantially the same as the step S3 in FIG. 4.

Then, the DVD drive apparatus 200 performs either the formation of the link-loss area and the recording of the read error data, or the formation of the link-loss area and the recording of the second user data block (step S89 or S94). This procedure is as follows, for example.

If the link-loss area and the recording of the read error data are performed, firstly, the DVD drive apparatus 200 receives the writing command and dummy data, from the host device 6. The dummy data is, for example, zero data. The received writing command is sent to the read error data insertion device 201 through the total control device 23. Moreover, the received dummy data is stored into the buffer memory 17.

Then, the link-loss area formation device 15 records the link-loss data immediately after the first user data block recorded in the recording zone, to thereby form the link-loss area immediately after the first user data block, under the control of the total control device 23 (step S89).

Then, the read error data insertion device 201 judges whether or not to record the read error data (step S90). The judgment is performed in the following procedure, for example. The writing command sent from the host device 6 to the DVD drive apparatus 200 has information appended, which indicates whether or not to record the read error data. For example, the read error data recording flag indicating whether or not to record the read error data is appended to the writing command. The read error data insertion device 201 receives the writing command and the read error data recording flag, through the total control device 23. Then, the read error data insertion device 201 judges whether or not to record the read error data, on the basis of the read error data recording flag.

If the read error data is recorded, the read error data recording flag indicates that the read error data is to be recorded. Therefore, the read error data insertion device 201 judges that the read error data is to be recorded, on the basis of the read error data recording flag (step S90: YES).

Then, the read error data generation device 202 reads the dummy data from the buffer memory 17 and generates the read error data by using the dummy data (step S91). The size of the read error data generated here is a size of 1ECC block. Except this point, the structure and generation method of the read error data are the same as in the case of the DVD drive apparatus 7.

Then, the read error data generation device 202 records the read error data generated in the step S90, into the recording zone (step S92). By this, the read error data is recorded immediately after the link-loss area formed in the step S89.

After the formation of the link-loss area and the recording of the read error data are ended, the read error data insertion device 201 performs the process of ending the recording of the read error data, in accordance with the synchronize cache command issued from the host device 6 (step S94).

After that, the recording history of the read error data is recorded into the RMA of the DVD. Specifically, if the start of the data recording process to the end (interrupt) of the recording process by the synchronize cache command is regarded as one recording cycle, the address of the user data recorded last in the previous recording cycle is rewritten to the address of the user data recorded last in this time's recording cycle.

On the other hand, if the formation of the link-loss area and the recording of the second user data block are performed, the DVD drive apparatus 200 firstly receives the writing command and the second user data block, from the host device 6. The received writing command is sent to the read error data insertion device 201 through the total control device 23. Moreover, the received second user data block is stored into the buffer memory 17.

Then, the link-loss area formation device 15 records the link-loss data immediately after the first user data block recorded in the recording zone, to thereby form the link-loss area immediately after the first user data block, under the control of the total control device 23 (step S89).

Then, the read error data insertion device 201 judges whether or not to record the read error data, on the basis of the read error data recording flag, for example (step S90).

If the user data block is recorded, the read error data recording flag indicates that the read error data is not to be recorded. Therefore, the read error data insertion device 201 judges that the read error data is not to be recorded, on the basis of the read error data recording flag (the step S90: NO).

Then, the user data recording control device 12 records the second user data block stored in the buffer memory 17, into the recording zone, in accordance with the writing command (step S93). By this, the second user data block is recorded immediately after the link-loss area formed in the step S89.

After the formation of the link-loss area and the recording of the second user data block are ended, the user data recording control device 12 performs the process of ending the recording of the read error data, in accordance with the synchronize cache command issued from the host device 6 (step S94).

After this, the recording history of the second user data block is recorded into the RMA of the DVD. That is, the address of the user data recorded last in the previous recording cycle is rewritten to the address of the user data recorded last in this time's recording cycle.

The processes from the step S88 to the step S94 are repeated until the recording of all the user data blocks included in the user data group is ended (step S95).

For example, while the processes from the step S88 to the step S94 are repeated, the recording of the read error data and the recording of the user data block are alternately performed. That is, in order to alternately perform the recording of the read error data and the recording of the user data block on the DVD drive apparatus 200, the host device 6 changes over the read error data recording flag, or the like. As a result, as shown in FIG. 21, a plurality of user data blocks 212 included in the user data group (first user data block #1, second user data block #2, third user data block #3, n-th user data block #n) are recorded into the recording zone 42, and moreover, read error data 213 is inserted between the two of the user data blocks 212. Moreover, a link-loss area 210 with link-loss data 211 is formed immediately before each of the user data blocks 212 and immediately before the read error data 213.

Then, the recording zone close device 104 of the DVD drive apparatus 200 closes the recording zone (step S96 in FIG. 20). That is, the recording zone close device 104 performs the padding by recording the normal padding data into the remaining area, which exists at the tail of the recording zone in which the recording of the user data group is ended, to thereby close the recording zone. The process of closing the recording zone in this step is the same as the steps S21, S25, S26, and S27 in FIG. 5.

Then, the DVD drive apparatus 200 judges whether or not to end the write-once process (step S97). If the write-once process is to be continued, such as the case that there is the user data group to be written once next, the DVD drive apparatus 200 judges that the write-once process is not to be ended (the step S97: NO). In this case, the process of the DVD drive apparatus 200 returns to the step S87. On the other hand, if there is no user data group to be written once next, the DVD drive apparatus 200 judges that the write-once process is to be ended (the step S97: YES). By this, the write-once process of the DVD drive apparatus 200 is ended.

Incidentally, once cell is formed by a group of read error data recorded in the recording zone, and this cell is regarded as the cell not to be reproduced by the program chain.

As explained above, on the DVD drive apparatus 200, while the user data included in the user data group is recorded into the recording zone, the process of recording the user data is interrupted, and the read error data is recorded into the recording zone, to hereby insert the read error data into the user data group. By this, it is possible to enhance the copy prevention of the information recorded on the DVD.

For example, as shown in FIG. 21, if the user data group is divided into many user data blocks 212 and the recording of the user data blocks 212 and the recording of the read error data 213 are alternately performed, many read error data 213 can be discretely disposed in the recording zone 42. This makes it hard for the copier to find the read error data 213, and enhance the copy prevention of the information recorded on the DVD.

Moreover, by making the sizes of the user data blocks randomly different from each other, it is possible to lose the regularity of the recording position of the read error data in the recording zone. This makes it harder for the copier to find the read error data, and further enhance the copy prevention of the information recorded on the DVD.

Moreover, according to the DVD drive apparatus 200, as shown in FIG. 21, the first user data block #1 is recorded at the head of the recording zone, and the last user data block #n is recorded at the tail of the recording zone. That is, the read error data is not recorded at the head of the recording zone nor at the tail of the recording zone. This makes it harder for the copier to find the read error data, and further enhance the copy prevention of the information recorded on the DVD.

That is, the recording management information in the RMA of the DVD includes the information indicating the head address of the recording zone. Thus, if the read error data is recorded at the head of the recording zone, there is the possibility that the recording management information is read, that the head address of the recording zone is learned on the basis of the recording management information, and that the recording position of the read error data can be easily learned on the basis of the head address. However, according to the DVD drive apparatus 200, since the read error data is not recorded at the head of the recording zone, even if the copier learns the head address of the recording zone on the basis of the recording management information, it is hard to find the recording position of the read error data recorded in the recording zone on the basis of the head address.

Moreover, the recording management information includes the information indicating the address of the user data recorded last in the data recording area. If the recording zone is closed and the write-once process is ended, the user data recorded last in the data recording area is the user data recorded last in the recording zone. If so, in this case, the recording management information includes the information indicating the address of the user data recorded last in the recording zone. Thus, if the read error data is padded at the tail of the recording zone (i.e. between the user data recorded last in the recording zone and the end edge of the recording zone), there is the possibility that the recording management information is read, and that the position of the read error data padded at the tail of the recording zone can be easily learned on the basis of the recording management information. However, according to the DVD drive apparatus 200, since the read error data is not recorded at the head of the recording zone, even if the copier learns the address of the user data recorded last in the recording zone on the basis of the recording management information, it is hard to find the recording position of the read error data recorded in the recording zone on the basis of the head address.

Incidentally, the third embodiment of the present invention can be applied to another optical disc, such as a Blu-ray disc.

Moreover, the recording zone reservation device 11 in FIG. 2 is a specific example of the recording zone reserving device. The user data recording control device 12 is a specific example of the user data recording device. The recording zone close device 13 is a specific example of the recording zone closing device. The read error data generation device 14 is a specific example of the read error data generating device. Moreover, the recording zone close device 13 is a specific example of the read error data recording device.

Moreover, the link-loss area formation device 101 in FIG. 15 is a specific example of the link-loss area forming device. Moreover, the link-loss area formation device 101 is a specific example of the read error data recording device.

Moreover, the read error data insertion device 201 is a specific example of the read error data inserting device. Moreover, the read error data insertion device 201 is a specific example of the read error data recording device.

Moreover, the step S4 in FIG. 4 is a specific example of the recording zone reserving process. The step S6 is a specific example of the user data recording process. The step S9 is a specific example of the read error data recording process. Moreover, each step in FIG. 5 is a more specific example of the read error data recording process.

Moreover, the step S54 in FIG. 16 is a specific example of the recording zone reserving process. The step S56 is a specific example of the user data recording process. The step S55 is a specific example of the read error data recording process. Moreover, each step in FIG. 17 is a more specific example of the read error data recording process.

Moreover, the step S84 in FIG. 19 is a specific example of the recording zone reserving process. The step S86 in FIG. 19 and the step S93 in FIG. 20 are a specific example of the user data recording process. The step S91 and the step S92 in FIG. 20 are a specific example of the read error data recording process.

Moreover, the present invention can be embodied as a computer program. In this case, the computer program that describes the command to realize the write-once process is prepared, as shown in FIG. 4 and FIG. 5 (or FIG. 16 and FIG. 17, or FIG. 19 and FIG. 20). Then, the computer program is recorded on an information recording medium which can be easily carried, such as an optical disc, and this information recording medium is sold to a user. The user who purchases this information recording medium inserts the information recording medium into an information reading apparatus, such as a disc drive apparatus, mounted on a computer, and makes the computer read the computer program recorded on the information recording medium. This allows a computer resource owned by the computer to function as the information recording apparatus of the present invention, and the write-once process shown in FIG. 4 and FIG. 5 (or FIG. 16 and FIG. 17, or FIG. 19 and FIG. 20) to be realized by the computer. Moreover, the information recording medium on which the computer program is recorded may not be sold to the user, but the computer program may be distributed to the user through a computer network, such as the Internet, as a computer program product.

Example

FIG. 22 shows a DVD drive apparatus 120, which is an example of the information recording apparatus of the present invention. The DVD drive apparatus 120 is the further embodied DVD drive apparatus 7 in FIG. 2. On the DVD drive apparatus 120 in FIG. 22, a CPU 121 operates as the recording zone reservation device 11, the user data recording control device 12, the recording zone close device 13, the read error data generation device 14, the link-loss area formation device 15, and the total control device 23 in FIG. 2. That is, a ROM 122 stores therein a program for realizing the operations of the recording zone reservation device 11, the user data recording control device 12, the recording zone close device 13, the read error data generation device 14, the link-loss area formation device 15, and the total control device 23 in FIG. 2. The CPU 121 reads the program from the ROM 122 and executes it. When the CPU 121 executes this program, a RAM 123 is used as a working memory area.

A signal processing circuit 125 is provided with: a buffer memory 126; an encoder unit 127; and a decoder unit 128. The encoder unit 127 is provided with an EDC encoder, an ECC encoder, and an 8/16 modulation circuit, or the like. The signal processing circuit 125 can DMA-transfers the data stored in the buffer memory 126, to the encoder unit 127.

A driving control circuit 129 controls the rotation of a spindle motor 130, the displacement of an optical pickup 131, and the like.

The CPU 121 is connected to a host device 140 through an ATAPI interface 132. The CPU 121 receives a reserve command, a writing command, a close command, and the like, which are sent from the host device 140, and performs the write-once process shown in FIG. 4 and FIG. 5, in accordance with the commands. By this, a link-loss area and a recording zone are formed in the data recording area of a DVD 150, and the user data group and the read error data are recorded into the recording zone.

The present invention is not limited to the aforementioned embodiment, but various changes may be made, if desired, without departing from the essence or spirit of the invention which can be read from the claims and the entire specification. An information recording apparatus, an information recording method, and a computer program, all of which involve such changes, are also intended to be within the technical scope of the present invention.

INDUSTRIAL APPLICABILITY

The information recording apparatus for and the information recording method of generating the copy prevention structure according to the present invention can be applied to an information recording apparatus for recording information onto an information recording medium, such as a DVD. Moreover, they can be applied to an information recording apparatus or the like which is mounted on various computer equipment for consumer use or for commercial use, or which can be connected to various computer equipment.

The invention claimed is:

1. An information recording apparatus for recording user data onto an information recording medium, in accordance with a recording method in which the user data can be further written once after the user data is once recorded, said information recording apparatus comprising:

a recording zone reserving device for reserving a recording zone on the information recording medium, the recording zone being a continuous area for writing once a user data group, which is a group of the user data;

a user data recording device for recording the user data included in the user data group, into the recording zone reserved by said recording zone reserving device; and a read error data recording device for recording read error data onto the information recording medium, the read error data causing a read error when information is read from the information recording medium by another apparatus, wherein said read error data recording device comprises a recording zone closing device for performing padding by recording the read error data as padding data into a remaining area, which exists at a tail of the recording zone in which the recording of the user data by said user data recording device is finished, to thereby close the recording zone, and said recording zone reserving device reserves the recording zone with a size obtained by totalizing a size of the user data and a size of the read error data.

2. The information recording apparatus according to claim 1, wherein said recording zone closing device comprises a read error data generating device for generating the read error data.

3. The information recording apparatus according to claim 2, wherein said read error data generating device generates the read error data by appending an error detection code, which is not a correct value, to data prepared to be used as the padding data.

4. The information recording apparatus according to claim 2, wherein said read error data generating device generates the read error data by appending a PI/PO error correction code, which is not a correct value, to data prepared to be used as the padding data.

5. The information recording apparatus according to claim 1, comprising:
- a buffer memory for temporarily storing therein the user data;
- an encoding device for encoding the user data; and
- a data transferring device for transferring the user data stored in said buffer memory, in a high-speed data transfer method from said buffer memory to said encoding device, said user data recording device recording all the user data included in the user data group, which is encoded by said encoding device, into the recording zone, continuously and at a double recording speed or more.

6. An information recording method of recording user data onto an information recording medium, in accordance with a recording method in which the user data can be further written once after the user data is once recorded, said information recording method comprising:
- a recording zone reserving process of reserving a recording zone on the information recording medium, the recording zone being a continuous area for writing once a user data group, which is a group of the user data;
- a user data recording process of recording the user data included in the user data group, into the recording zone reserved by said recording zone reserving device; and
- a read error data recording process of recording read error data onto the information recording medium, the read error data causing a read error when information is read from the information recording medium by another apparatus,
- wherein said read error data recording process comprises a recording zone closing process of performing padding by recording the read error data as padding data into a remaining area, which exists at a tail of the recording zone in which the recording of the user data by said user data recording device is finished, to thereby close the recording zone, and said recording zone reserving process reserves the recording zone with a size obtained by totalizing a size of the user data and a size of the read error data.

7. A computer program product in a non-transitory computer-readable medium for tangibly embodying a program of instructions executable by a computer provided for the information recording apparatus, said computer program making the computer perform the information recording method according to claim 6.

* * * * *